United States Patent
Kim et al.

(10) Patent No.: US 8,467,341 B2
(45) Date of Patent: Jun. 18, 2013

(54) METHOD AND APPARATUS FOR NEGOTIATING A MULTI-CARRIER CONFIGURATION IN A WIRELESS ACCESS SYSTEM

(75) Inventors: So Yeon Kim, Goyang-si (KR); Jae Hoon Chung, Yongin-si (KR); Hyun Soo Ko, Seoul (KR); Seung Hee Han, Anyang-si (KR); Moon Il Lee, Yongin-si (KR)

(73) Assignee: LG Electronics, Inc., Seoul (KR)

( * ) Notice: Subject to any disclaimer, the term of this patent is extended or adjusted under 35 U.S.C. 154(b) by 282 days.

(21) Appl. No.: 12/812,718

(22) PCT Filed: Feb. 5, 2009

(86) PCT No.: PCT/KR2009/000563
§ 371 (c)(1), (2), (4) Date: Jul. 13, 2010

(87) PCT Pub. No.: WO2009/099303
PCT Pub. Date: Aug. 13, 2009

(65) Prior Publication Data
US 2010/0296473 A1    Nov. 25, 2010

Related U.S. Application Data

(60) Provisional application No. 61/026,141, filed on Feb. 5, 2008, provisional application No. 61/085,425, filed on Aug. 1, 2008, provisional application No. 61/087,160, filed on Aug. 7, 2008, provisional application No. 61/093,458, filed on Sep. 2, 2008.

(30) Foreign Application Priority Data

Feb. 4, 2009  (KR) .................. 10-2008-0008915
Feb. 4, 2009  (KR) .................. 10-2009-0008916

(51) Int. Cl.
*H04W 4/00*   (2009.01)

(52) U.S. Cl.
USPC ......... 370/329; 370/328; 455/450; 455/452.1

(58) Field of Classification Search
None
See application file for complete search history.

(56) References Cited

U.S. PATENT DOCUMENTS

| | | | |
|---|---|---|---|
| 2005/0026616 A1* | 2/2005 | Cavalli et al. | 455/436 |
| 2007/0097908 A1* | 5/2007 | Khandekar et al. | 370/329 |
| 2008/0117873 A1* | 5/2008 | Ranta-Aho et al. | 370/329 |
| 2010/0296446 A1* | 11/2010 | Zhang et al. | 370/328 |

FOREIGN PATENT DOCUMENTS

| | | |
|---|---|---|
| CN | 1956589 A | 5/2007 |
| DE | 10215381 A1 | 10/2003 |
| EP | 0679043 A2 | 10/1995 |

OTHER PUBLICATIONS

Universal Mobile Telecommunications System (UMTS); Physical layer procedures (FDD), 3GPP TS 25.214 version 7.4.0 Release 7, Mar. 2007, pp. 1-78.*

* cited by examiner

*Primary Examiner* — Donald Mills
(74) *Attorney, Agent, or Firm* — Birch, Stewart, Kolasch & Birch, LLP

(57) ABSTRACT

A method for efficiently transmitting and receiving a control channel and/or a data channel in a radio communication system using multiple carriers is described. The embodiments of the present invention provide various multi-carrier system structures and various methods for setting a reference carrier in a multi-carrier system. The embodiments of the present invention also provide methods for efficiently transmitting control channels using a coordination field.

20 Claims, 19 Drawing Sheets

(a)

(b)

(a)

(b)

(a)

(b)

(a)

(b)

(a)

(b)

METHOD AND APPARATUS FOR NEGOTIATING A MULTI-CARRIER CONFIGURATION IN A WIRELESS ACCESS SYSTEM

This application is the National Phase of PCT/KR2009/000563 filed on Feb. 5, 2009, which claims priority under 35 U.S.C. 119(e) to U.S. Provisional Application Nos. 61/026,141 filed on Feb. 5, 2008, 61/085,425 filed on Aug. 1, 2008, 61/087,160 filed on Aug. 7, 2008 and 61/093,458 filed on Sep. 2, 2008 and further claims priority under 35 U.S.C. 119 (a) to Application Nos. 10-2009-0008915 and 10-2009-0008916, both filed in Republic of Korea on Feb. 4, 2009. The entire contents of these applications are hereby incorporated by reference into the present application.

TECHNICAL FIELD

The present invention relates to efficient methods for transmitting and receiving a control channel and/or a data channel in a radio communication system using multiple carriers.

BACKGROUND ART

A brief description of carriers will be given hereinbelow.

A user may perform modulation on the amplitude, frequency, and/or phase of a sine wave or a periodic pulse wave to include information which is desired to be transmitted. At this time, the sine wave or pulse wave serving to convey information is called a carrier.

A method for modulating a carrier includes a single-carrier modulation (SCM) scheme and a multi-carrier modulation (MCM) scheme. The SCM scheme performs modulation such that all information is carried on a single carrier.

The MCM scheme divides an entire bandwidth channel of one carrier into subchannels having multiple narrow bandwidths and transmits multiple narrowband subcarriers through respective subchannels.

When using the MCM scheme, each subchannel may approximate to a flat channel due to a narrow bandwidth. A user may compensate for distortion of a channel using a simple equalizer. The MCM scheme may be implemented at a high speed using fast Fourier transform (FFT). Namely, the MCM scheme is favorable during high-rate data transmission as compared to the SCM scheme.

As the capabilities of a base station and/or a terminal have been developed, a frequency bandwidth which can be provided or used by the base station and/or the terminal has been enlarged. Accordingly, in the embodiments of the present invention, a multi-carrier system supporting broadband by aggregating one or more carriers is proposed.

Specifically, the multi-carrier system, which will be described hereafter, uses carriers by aggregating one or more carriers, unlike the afore-mentioned MCM scheme which uses carriers by segregating one carrier.

To efficiently use multiple bands or multiple carriers, a technique in which one medium access control (MAC) entity manages multiple carriers (e.g., multiple frequency allocations (FAs)) has been proposed.

FIGS. 1a and 1b illustrate methods for transmitting and receiving signals based on a multi-band radio frequency (RF).

In FIGS. 1a and 1b, one MAC layer in each of a transmitting end and a receiving end may manage multiple carriers to efficiently use the multiple carriers. To effectively transmit and receive the multiple carriers, it is assumed that both the transmitting end and the receiving end can transmit and receive the multiple carriers. Since frequency carriers managed by one MAC layer do not need to be contiguous, the above method enables flexible resource management. More specifically, the frequency carriers may have contiguous aggregation or non-contiguous aggregation.

In FIGS. 1a and 1b, PHY 0, PHY 1, . . . , PHY n-2, and PHYn-1 represent multiple bands and each of the bands may have an FA size allocated for a specific service according to a predetermined frequency policy. For example, PHY 0 (RF carrier 0) may have an FA size allocated for a general FM radio broadcast and PHY 1 (RF carrier 1) may have an FA size allocated for cellular phone communication.

Although each frequency band may have a different FA size depending on the characteristics thereof, it is assumed in the following description that each FA has a size of A MHz for convenience of explanation. Each FA may be represented by a carrier frequency that enables a baseband signal to be used in each frequency band. Thus, in the following description, each FA will be referred to as a "carrier frequency band" or will simply be referred to as a "carrier" representing each carrier frequency band unless such use causes confusion. As in the recent $3^{rd}$ generation partnership project (3GPP) long term evolution-advanced (LTE-A), the carrier may also be referred to as a "component carrier" to discriminate it from a subcarrier used in the multi-carrier system.

From this aspect, the "multi-band" scheme may also be referred to as a "multi-carrier" scheme or a "carrier aggregation" scheme.

To transmit signals through multiple bands as shown in FIG. 1a and to receive signals through multiple bands as shown in FIG. 1b, a transmitter and a receiver need to include an RF module for transmitting and receiving signals through multiple bands. In FIGS. 1a and 1b, a method of configuring the "MAC" is determined by a base station, regardless of downlink or uplink.

In brief, the above scheme is a technology in which one MAC entity (hereinafter, referred to as a "MAC" unless such use causes confusion) manages and operates a plurality of RF carriers, thereby transmitting and receiving signals. The RF carriers managed by one MAC do not need to be contiguous. Accordingly, this technology has an advantage of high flexibility in terms of resource management.

FIG. 2 illustrates an example of a method for allocating frequencies in a multi-carrier system.

In FIG. 2, bands FA 0 to FA 7 can be managed by RF carriers RF 0 to RF 7. In the example of FIG. 2, it is assumed that the bands FA 0, FA 2, FA 3, FA 6, and FA 7 have already been allocated to specific existing communication services. It is also assumed that available RF carriers RF 1 (FA 1), RF 4 (FA 4), and RF 5 (FA 5) can be efficiently managed by one MAC (MAC #5). Here, since the RF carriers managed by one MAC need not to be contiguous as described above, it is possible to more efficiently manage frequency resources.

In the case of downlink, the following base station/terminal scenario exemplifies the concept of the above-described multi-band support scheme or carrier aggregation support scheme.

FIG. 3 illustrates an example of a scenario in which one base station communicates with a plurality of terminals in a multi-band support scheme.

In FIG. 3, it is assumed that terminals (mobile station (MSs) or user equipments (UEs)) 0, 1, and 2 have been multiplexed. A base station (BS) (or node-B) 0 transmits signals through frequency bands managed by RF carriers RF 0 and RF 1. It is also assumed that the terminal 0 is capable of receiving only the RF carrier RF 0, the terminal 1 is capable of receiving both the RF carriers RF 0 and RF 1, and the terminal 2 is capable of receiving all the RF carriers RF 0, RF 1, and RF 2. Here, since the base station transmits only the RF carriers RF 0 and RF 1, the terminal 2 receives signals of only the RF carriers RF 0 and RF 1.

However, the above multi-band based communication scheme has only been conceptually defined and can be interpreted as further allocating FA only as needed. Therefore, it is necessary to specify in more detail a multiplexing method or a signal transmitting/receiving method, for more efficient and higher performance.

Further, since channel coding or multiplexing is generally performed with respect to each frequency band as described above, a diversity gain or multiplexing gain may be limited.

DISCLOSURE

Technical Problem

An object of the present invention devised to solve the problem lies on providing a transmission and reception method for improving the reliability or throughput of a system in one MAC managing one or more RF carriers.

Another object of the present invention devised to solve the problem lies on providing a method wherein one terminal supports a multi-carrier system and can be configured by multiple MACs in a hybrid combination form.

A further object of the present invention devised to solve the problem lies on providing a method for effectively transmitting and receiving a control channel or a data channel on multiple carriers when a terminal uses multiple frequency bands.

Another object of the present invention devised to solve the problem lies on providing a method for a terminal to efficiently receive a control channel in a multi-carrier system, that is, a method for efficiently transmitting and receiving the control channel using a coordination field.

Technical Solution

To solve the technical problem, the embodiments of the present invention disclose efficient methods for transmitting a control channel and/or a data channel in a radio communication system using multiple carriers. Moreover, methods for efficiently transmitting and receiving a control channel using a coordination field and/or a reference carrier are disclosed.

The object of the present invention can be achieved by providing a method for transmitting a radio channel in a radio access system supporting multiple carriers, including allocating the radio channel to the multiple carriers, wherein the radio channel includes one or more control channels and one or more data channels, transmitting a first control channel among the control channels to a first terminal, transmitting a second control channel among the control channels to a second terminal, transmitting a first data channel indicated by the first control channel to the first terminal, and transmitting a second data channel indicated by the second control channel to the second terminal.

The allocating of the radio channel may allocate the control channels and the data channels with respect to each carrier included in the multiple carriers. The allocating of the radio channel may allocate control channels including control information as to all data channels for the multiple carriers only to a prescribed carrier among the multiple carriers.

The allocating of the radio channel may allocate control channels including control information as to a prescribed data channel for the multiple carriers only to a prescribed carrier among the multiple carriers.

The method may further include setting a reference carrier among the multiple carriers, wherein the reference carrier includes control information for the multiple carriers. The reference carrier may be set using one of cell-specific information, terminal-specific information, and terminal group-specific information.

The first control channel, the second control channel, and the first data channel may be transmitted through the reference carrier, and the second data channel may be transmitted through one or more carriers included in the multiple carriers, and the first terminal may be a terminal supporting a single carrier, and the second terminal may be a terminal supporting multiple carriers. The reference carrier may include carrier common control information (CCCI) including common control information for the multiple carriers.

The method may further include transmitting the carrier common control information (CCCI) to at least one of the first terminal and the second terminal.

The method may further include receiving channel environment information from at least one of the first terminal and the second terminal, and re-allocating the reference carrier according to the channel environment information.

The one or more control channels may be a physical downlink control channel (PDCCH), and the one or more data channels may be a physical downlink shared channel (PDSCH).

In another aspect of the present invention, provided herein is a method for receiving a radio channel in a radio access system supporting multiple carriers, including receiving a physical downlink control channel (PDCCH) from a base station through one or more reference carriers, and receiving a physical downlink shared channel (PDSCH) indicated by the PDCCH, wherein the PDCCH and the PDSCH are included in the radio channel, and the reference carrier includes prescribed control information for the multiple carriers.

The reference carrier may be set using one of cell-specific information, terminal specific information, and terminal group-specific information.

The reference carrier may further include carrier common control information (CCCI) including common control information for the multiple carriers.

The method may further include receiving the carrier common control information (CCCI) from the base station. The PDSCH may be transmitted through a prescribed carrier among one or more carriers included in the multiple carriers.

In a further aspect of the present invention, provided herein is a method for transmitting a radio channel in a multi-carrier system, including transmitting a coordination field including multi-carrier support information through one or more reference carriers, transmitting a physical downlink control channel (PDCCH) according to the multi-carrier support information, and transmitting a physical downlink shared channel (PDSCH) according to information included in the PDCCH.

The method may further include setting the reference carrier including control information for the multiple carriers. The coordination field may be transmitted in units of a control channel element (CCE) every subframe. The coordination field may be transmitted in semi-static manner using higher layer signaling. The coordination field may include carrier indication information and blind decoding zone indication information allocated to a specific terminal. The coordination field may additionally include at least one of modulation & coding scheme (MCS) level information, multiple-input multiple-output (MIMO) scheme information, transmission scheme information, and power offset information.

The coordination field may be allocated at uniform intervals on a frequency axis in first to third symbol regions of each subframe.

In another aspect of the present invention, provided herein is a method for receiving a radio channel in a multi-carrier system, including receiving a coordination field including multi-carrier support information through one or more reference carriers, receiving a physical downlink control channel (PDCCH) according to the multi-carrier support information, and receiving a physical downlink shared channel (PDSCH) according to information included in the PDCCH.

The coordination field may include control information for multiple carriers. The coordination field may be transmitted in units of a control channel element (CCE) every subframe. The coordination field may include carrier indication information and blind decoding zone indication information allocated to a specific terminal. The coordination field may include at least one of modulation & coding scheme (MCS) level information, multiple-input multiple-output (MIMO) scheme information, transmission scheme information, and power offset information.

The coordination field may be allocated at uniform intervals on a frequency axis in first to third symbol regions of each subframe.

Advantageous Effects

According to the embodiments of the present invention, the following effects are obtained.

First, a control channel and a data channel are effectively transmitted and received, thereby performing reliable communication in a system configured by one or more RF carriers.

Second, a control channel is effectively transmitted and received in a multi-carrier system, thereby improving overall data throughput.

Third, since a terminal uses multiple frequency bands in a multi-carrier system, a control channel or a data channel can be more effectively transmitted and received on multiple carriers.

Fourth, when a terminal uses a multi-band frequency, a control channel or a data channel can be more effectively transmitted and received on multiple carriers.

Fifth, a terminal can effectively receive a control channel in a multi-carrier system. That is, the control channel can be effectively received using a coordination field. Therefore, reliable data communication can be performed and data throughput can be increased.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
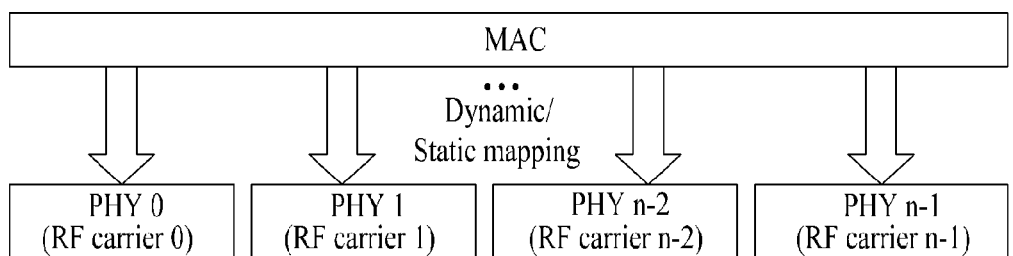
FIGS. 1a and 1b illustrate methods for transmitting and receiving signals based on a multi-band radio frequency.
Figure 1:
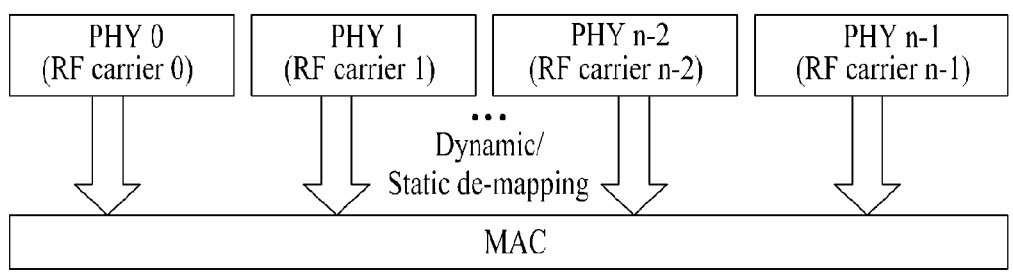
Figure 2:
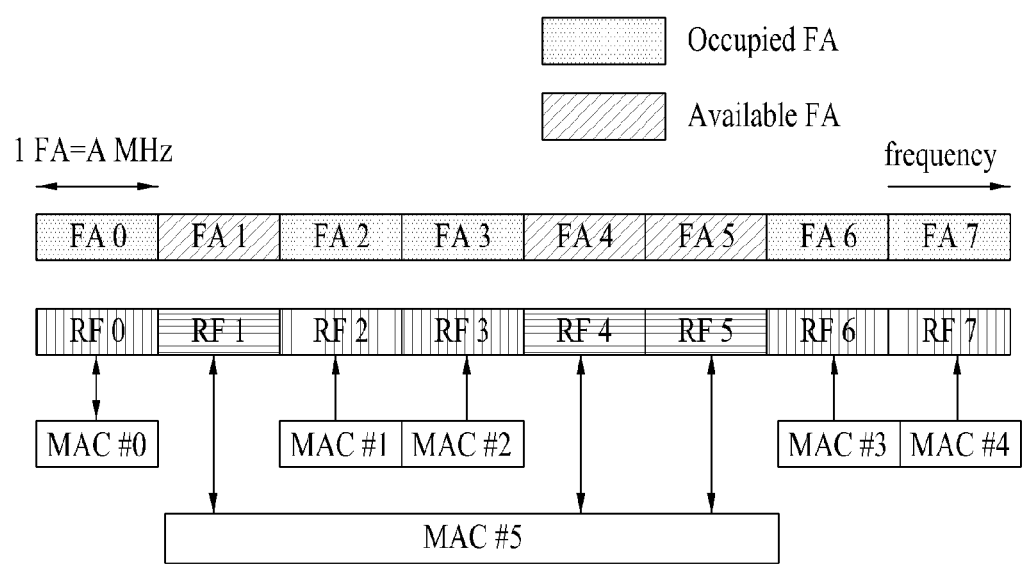
FIG. 2 illustrates an example of a method for allocating frequencies in a multi-carrier system.

The present invention provides a radio access system. The embodiments of the present invention describe methods for effectively transmitting a control channel and/or a data channel in a radio communication system using multiple carriers. The embodiments of the present invention also describe methods for transmitting a control channel and/or a data channel using one or more reference carriers.

The embodiments described below are provided by combining components and features of the present invention in specific forms. The components or features of the present invention can be considered optional if not explicitly stated otherwise. The components or features may be implemented without being combined with other components or features. The embodiments of the present invention may also be provided by combining some of the components and/or features. The order of operations in the embodiments of the present invention may be changed. Some components or features of one embodiment may be included in another embodiment or may be replaced with corresponding components or features of another embodiment.

In a description of the drawings, procedures or steps which may obscure the subject matter of the present invention will be not described and procedures or steps which can be understood by those skilled in the art will also be omitted.

The embodiments of the present invention will be described focusing on the data communication relationship between a base station and a terminal. Here, the base station refers to a terminal node of a network communicating directly with the terminal. In some cases, a specific operation described as being performed by the base station may be performed by an upper node of the base station.

Namely, it is apparent that the base station or any other network nodes may perform various operations for communication with the terminal in a network comprised of a plurality of network nodes including base stations. The term 'base station' may be replaced with the term 'fixed station', 'Node B', 'eNode B' (eNB), 'access point', etc. The term 'terminal' may be replaced with the term 'mobile station' (MS), 'user equipment' (UE), 'subscriber station' (SS), 'mobile subscriber station' (MSS), 'mobile terminal', etc.

A transmitting end refers to a node which transmits a data or voice service and a receiving end refers to a node which receives a data or voice service. Therefore, in uplink, a terminal may correspond to the transmitting end and a base station may correspond to the receiving end. Similarly, in downlink, the terminal may correspond to the receiving end and the base station may correspond to the transmitting end.

A terminal employed in the present invention may use a personal digital assistant (PDA), a cellular phone, a personal communication service (PCS) phone, a global system for mobile (GSM) phone, a wideband code division multiple access (wide CDMA) phone, a mobile broadband system (MBS) phone, etc.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

The embodiments of the present invention can be supported by standard documents of at least one of the IEEE 802 system, the 3GPP system, the 3GPP LTE system, the 3GPP LTE-Advanced system, and the 3GPP2 system which are radio access systems. That is, steps or portions that are not described in the embodiments of the present invention for the sake of clearly describing the spirit of the present invention can be supported by the above documents.

For all terms used in this disclosure, reference can be made to the above standard documents. Especially, the embodiments of the present invention can be supported by at least one of P802.16-2004, P802.16e-2005, and P802.16Rev2 which are standards documents of the IEEE 802.16 system.

Reference will now be made in detail to the exemplary embodiments of the present invention in conjunction with the accompanying drawings. The detailed description, which will be given below with reference to the accompanying drawings, is intended to explain exemplary embodiments of the present invention, rather than to show the only embodiments that can be implemented according to the invention. In addition, the specific terms used in the embodiments of the present invention are provided to aid the understanding of the present invention and those terms may be changed to other forms without departing from the spirit of the present invention.

In the embodiments of the present invention, a MAC layer may be used to refer to a layer of a higher concept than a physical layer PHY or layer 1 in an OSI 7 layer. In addition, although the following description has been given with reference to the drawings in which frequency carriers are contiguous, the frequency carriers are not necessarily physically contiguous.

In the following embodiments of the present invention, a description will focus on the downlink situation in which signals transmitted from a base station are transmitted to one or more terminals. However, the principle and embodiments which will be described hereinbelow may be applied to the uplink situation simply in a reverse order of the downlink.

Figure 4:
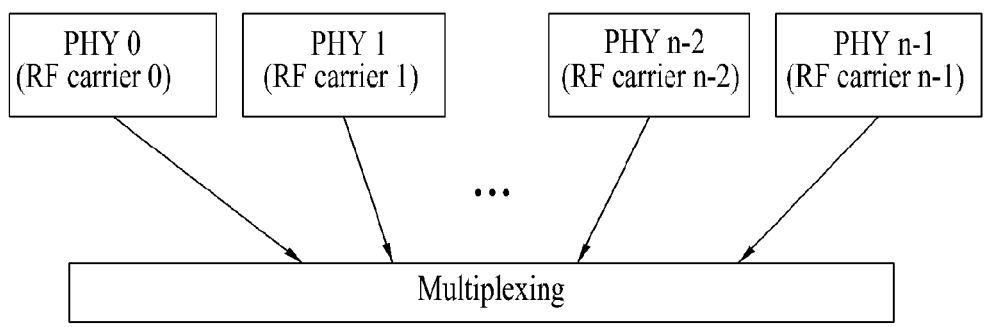
FIG. 4 illustrates an example of a multiplexing scheme used in a multi-carrier system.

FIG. 4 illustrates an example of a multiplexing scheme used in a multi-carrier system.

RF carriers or FAs used in the embodiments of the present invention may be RF carriers or FAs of the same system, or may be RF carriers or FAs receiving a service from different radio access technologies (RATs). For example, in FIG. 3, RF 0 and RF 1 may be used in an LTE system and RF 2 may be used in an IEEE 16 system.

When a mobile communication system supports a wideband frequency spectrum, the characteristics of channels may be different according to RF carriers or FAs. An RF carrier may have a size of 100 MHz, 700 MHz, 2 GHz, or 3.5 GHz for example. The following Table 1 shows an example of the characteristics of carriers according to frequencies.

TABLE 1

|  | 100 MHz | 700 MHz | 2 GHz | 3.5 GHz |
| --- | --- | --- | --- | --- |
| Carrier potential | Large cell support High speed support | Broadcast | IMT | IMT_Advanced |
| Doppler | Very low | Low | High | Very high |
| Delay spread | Wide & large | Medium | Medium | Low |

If a base station and a terminal communicate with each other using multiple carriers as shown in Table 1, the base station and/or the terminal may perform multiplexing/demultiplexing.

Referring to FIG. 4, the terminal may perform multiplexing at an RF stage to receive data transmitted from multiple carriers RF carrier 0, RF carrier 1, . . . , RF carrier n-2, and RF carrier n-1.

A receiving end may use an extremely wide band ranging from 100 MHz to 3.5 GHz used by multiple carriers. Accordingly, the receiving end needs to be equipped with a wideband filter which can cover the entire band.

An analog band pass filter (BPF) is inappropriate for use in a system supporting multiple carriers in terms of cost and is difficult to perform contiguous signal buffering upon analog signals. For multiplexing in a multi-carrier system, it is efficient to perform digital filtering upon multiple carriers on a time sample.

Figure 5:
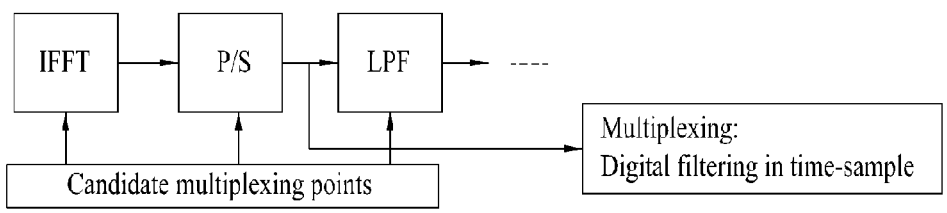
FIG. 5 illustrates a method for performing digital filtering on a time sample in a multi-carrier system.

FIG. 5 illustrates a method for performing digital filtering on a time sample in a multi-carrier system.

Referring to FIG. 5, digital filtering for multiple carriers may be performed in a part of an orthogonal frequency division multiplexing (OFDM) signal processing process. Specifically, the digital filtering may be performed before a continuous signal generator using a low pass filter (LPF) after an inverse fast Fourier transform (IFFT) process.

Figure 6:
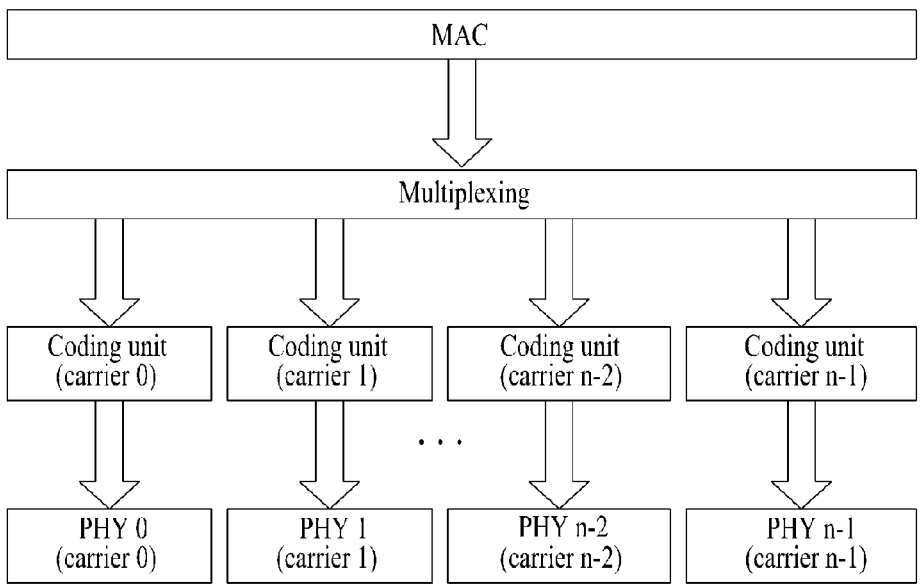
FIG. 6 illustrates a method for performing multiplexing in a MAC layer of a base station.

FIG. 6 illustrates a method for performing multiplexing in a MAC layer of a base station.

Referring to FIG. 6, a MAC layer of a base station multiplexes data, and coding units perform CRC attachment, channel coding, rate matching, code block segmentation, and/or code block concatenation, with respect to a transport block.

If each coding unit operates according to each carrier, the transport block for a data channel can be transmitted and received in each physical layer according to each carrier. A hybrid automatic repeat request (HARQ) operation corresponding to such an operation may also be independently performed within each carrier. Namely, a base station and a terminal may apply an appropriate link adaptation scheme or a multiple-input multiple-output (MIMO) scheme according to the characteristic of each carrier or to a channel status. Single codeword (SCW) or multiple codeword (MCW) transmission of each carrier can be freely selected according to a carrier.

Figure 7:
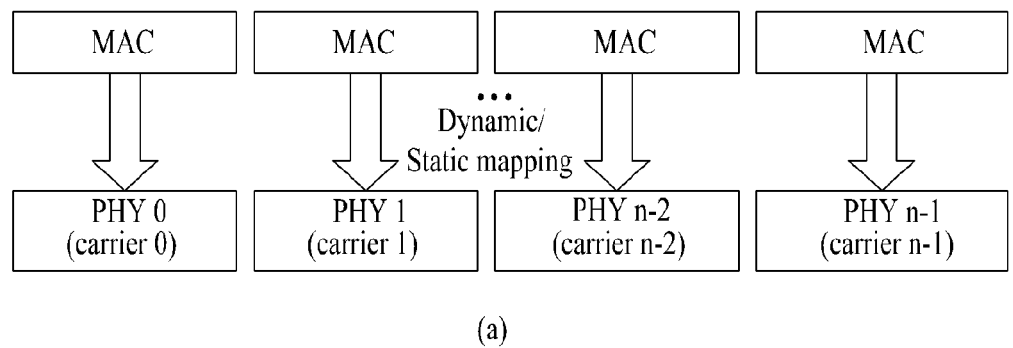
FIGS. 7a and 7b illustrate examples of a method for multiple MAC layers to manage multiple carriers.
Figure 7:
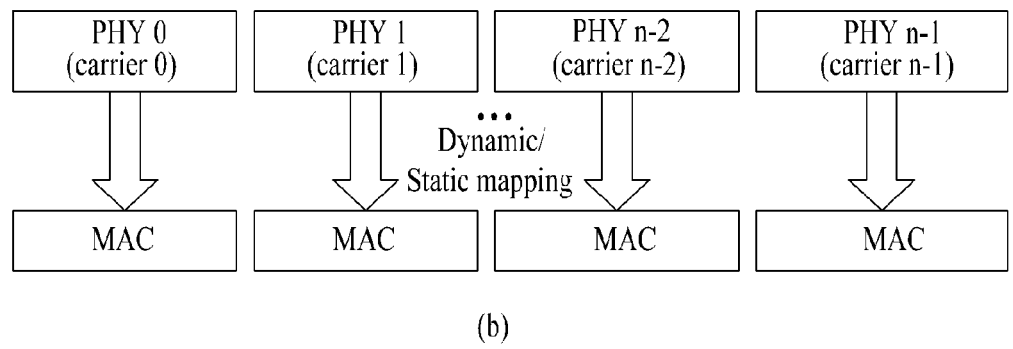

FIGS. 7a and 7b illustrate examples of a method for multiple MAC layers to manage multiple carriers.

FIG. 7a shows a one-to-one mapping relationship between MAC layers and physical layers when a transmitting end (base station) supports multiple carriers. FIG. 7b shows a one-to-one mapping relationship between MAC layers and physical layers when a receiving end (terminal) supports multiple carriers. In this case, one physical layer may use one carrier.

Figure 8:
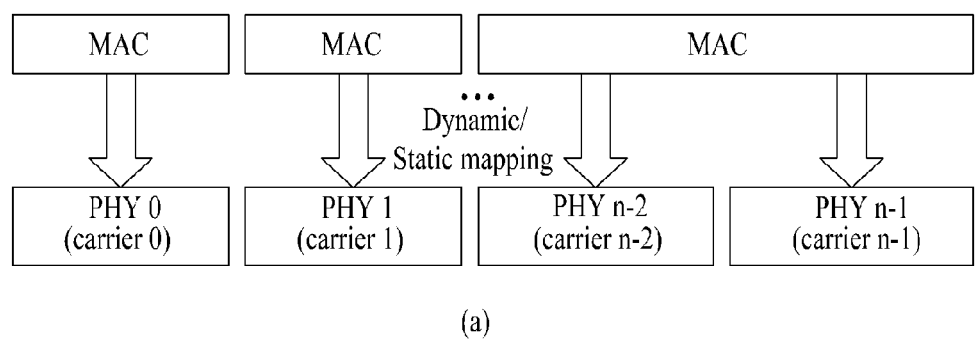
FIGS. 8a and 8b illustrate examples of a method for one MAC layer to manage one or more carriers.
Figure 8:
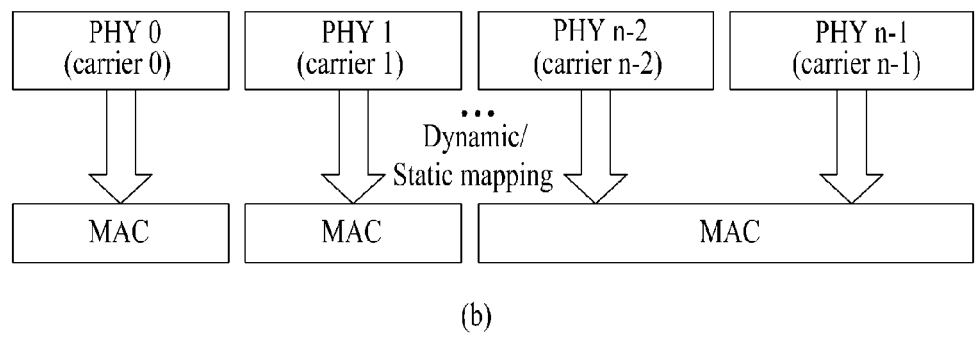

FIGS. 8a and 8b illustrate examples of a method for one MAC layer to manage one or more carriers.

In FIGS. 8a and 8b, MAC layers managing specific carriers (carrier 0 and carrier 1) may be independently mapped to respective physical layers, or one MAC layer managing one or more specific carriers (carrier n-2 and carrier n-1) may be mapped to respective physical layers. If such a hybrid method is used, the multiplexing method of FIG. 6 may be applied to partial carriers used by one MAC with respect to multiple physical layers.

FIG. 8a shows a one-to-one or one-to-m (where m>1) mapping relationship between MAC layers and physical layers when a transmitting end (base station) supports multiple carriers. FIG. 8b shows a one-to-one or one-to-m mapping relationship between MAC layers and physical layers when a receiving end (terminal) supports multiple carriers.

Figure 3:
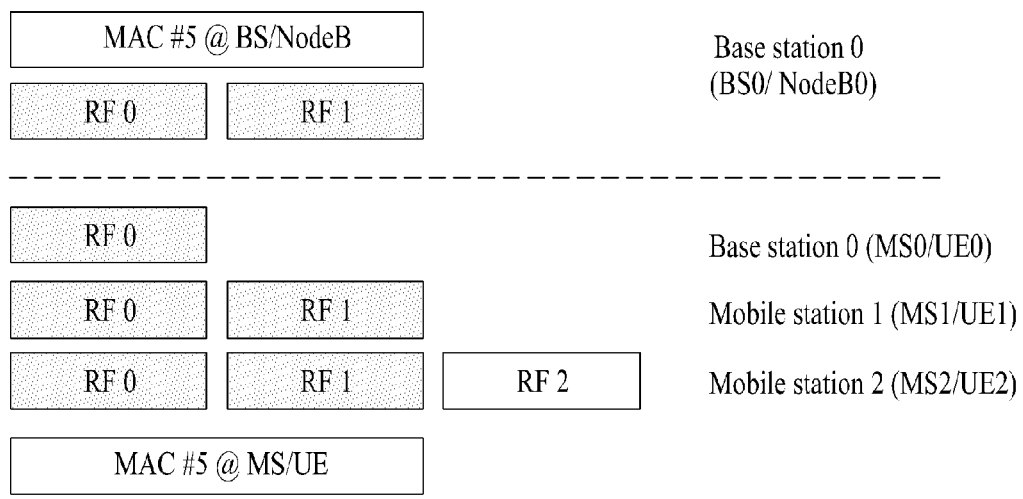
FIG. 3 illustrates an example of a scenario in which one base station communicates with a plurality of terminals in a multi-band support scheme.

In a system supporting multiple carriers, carriers used by each terminal may be different according to capabilities of the base station and the terminal, as illustrated in FIG. 3. However, carrier band support abilities of the base station may be uniformly determined. The base station and the terminal may negotiate with each other to decide whether to support carriers during call setup according to the capabilities of the base station.

In the embodiments of the present invention, information as to carrier support of the terminal, that is, information as to whether an arbitrary terminal can support an RF of a specific range or a specific frequency carrier may be one reference for identifying terminal (UE) categories.

Therefore, the base station and/or terminal specify a specific range or a specific carrier according to UE categories or UE classes. Hence, the base station and the terminal can negotiate with each other according to UE classes as to whether to support multiple carriers, whether to support simultaneous reception processing, simultaneous reception processing or adaptive carrier selection, parallel or sequential processing classification, and values such as carrier support range.

As an implicit UE category specifying method, UE categories can be implicitly identified based on a one-to-one mapping relationship by other parameters such as a reception available band of a terminal or peak data rate thereof.

The base station may specify supportable frequency carrier RFs in cell-specific radio resource control (RRC) information to transmit the specified RFs to any base station or terminals within a cell. For example, the base station may transmit supportable frequency carrier RFs to any base station or terminals within a cell through a primary broadcast channel (P-BCH), cell-specific RRC signaling, a broadcast control channel (BCCH), a dedicated broadcast channel (DBCH), or SU information.

Conversely, a terminal may inform a base station of information as to frequency carrier RFs, which can be received when accessing any base station or a cell, through additional signaling or by including the information in a profile.

A base station including a downlink scheduler and/or an uplink scheduler may semi-statically update information as to frequency carrier RFs which can be allocated to individual terminals. Accordingly, the base station can transmit the information as to frequency carrier RFs to individual terminals through UE-specific RRC signaling (or higher layer signaling).

For example, the base station may semi-statically transmit information as to candidate bands, which can be used by each terminal, i.e., information as to which carrier the base station can use, to terminals through RRC signaling according to capabilities of the base station and the terminal.

In a multi-carrier system for supporting transmission and reception of multiple carriers, a central frequency and a carrier bandwidth may be differently set according to each carrier. In addition, the number of frequency carriers, which can be supported by each base station and each terminal for transmission and reception, a detailed central frequency, and a frequency bandwidth may be differently set according to UE categories (e.g., UE levels) or base station categories (e.g., base station levels, cell levels, cluster levels, or network levels).

In a circumstance where the base station applies multiple carriers, content of necessary setup information and various control information according to setup, and a transmitting/receiving method therefore may be differently applied according to setting levels of UE categories or base station categories.

To set a central frequency of an international mobile telecommunications-advanced (IMT-A) or LTE-A system, the following two methods may be considered.

1. Method for locating a central frequency on multiple carriers while maintaining a frequency raster of an IMT system (or LTE system); and 2. Method for independently locating a central frequency regardless of a frequency raster of an IMT system.

Moreover, to support a wider system bandwidth of the IMT-A system than a system bandwidth of the IMT system, two methods for setting a bandwidth of each carrier included in multiple frequency carriers may be considered. For example, a method of operating multiple carriers depending on a target system bandwidth may be considered. Namely, a method for differently constructing the number of carriers or a bandwidth of each carrier may be considered to support a target system bandwidth.

Figure 9:
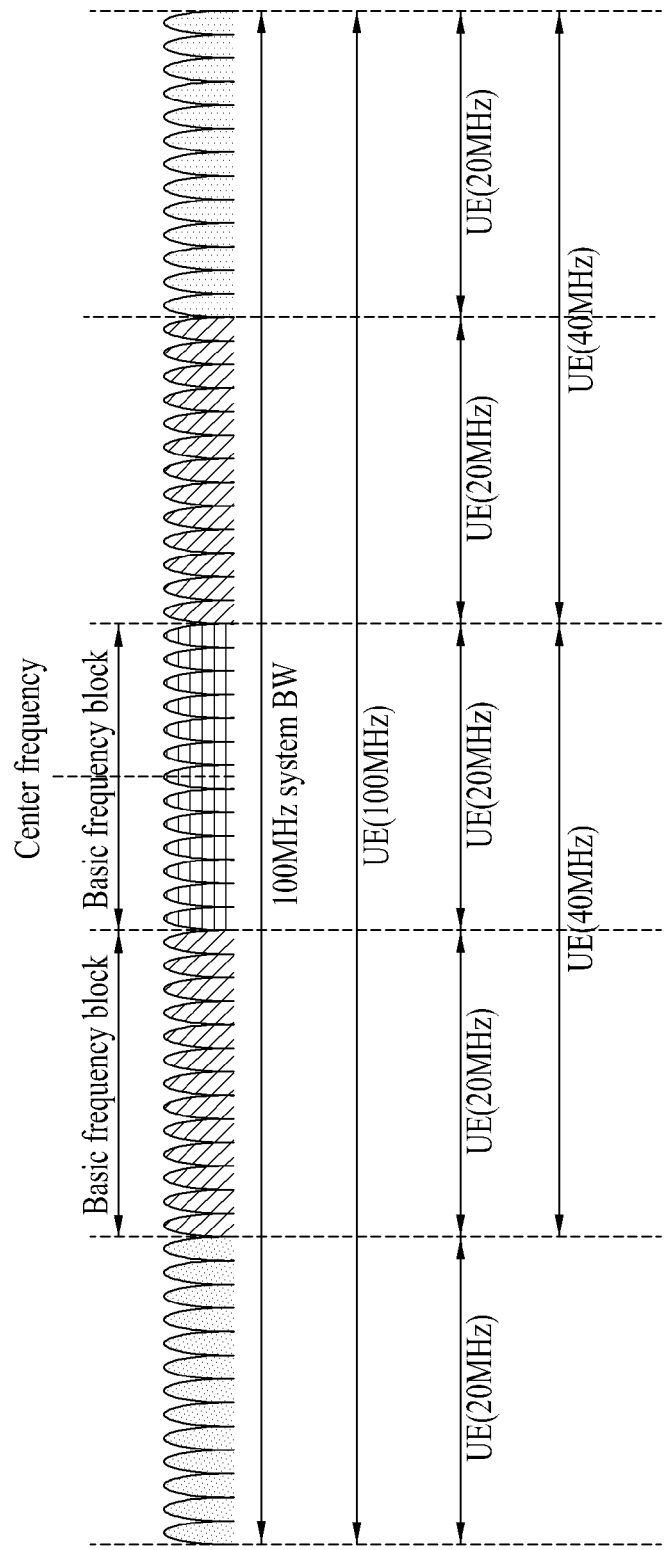
FIGS. 9 and 10 illustrate methods for setting a bandwidth of a carrier in a multi-carrier system.
Figure 10:
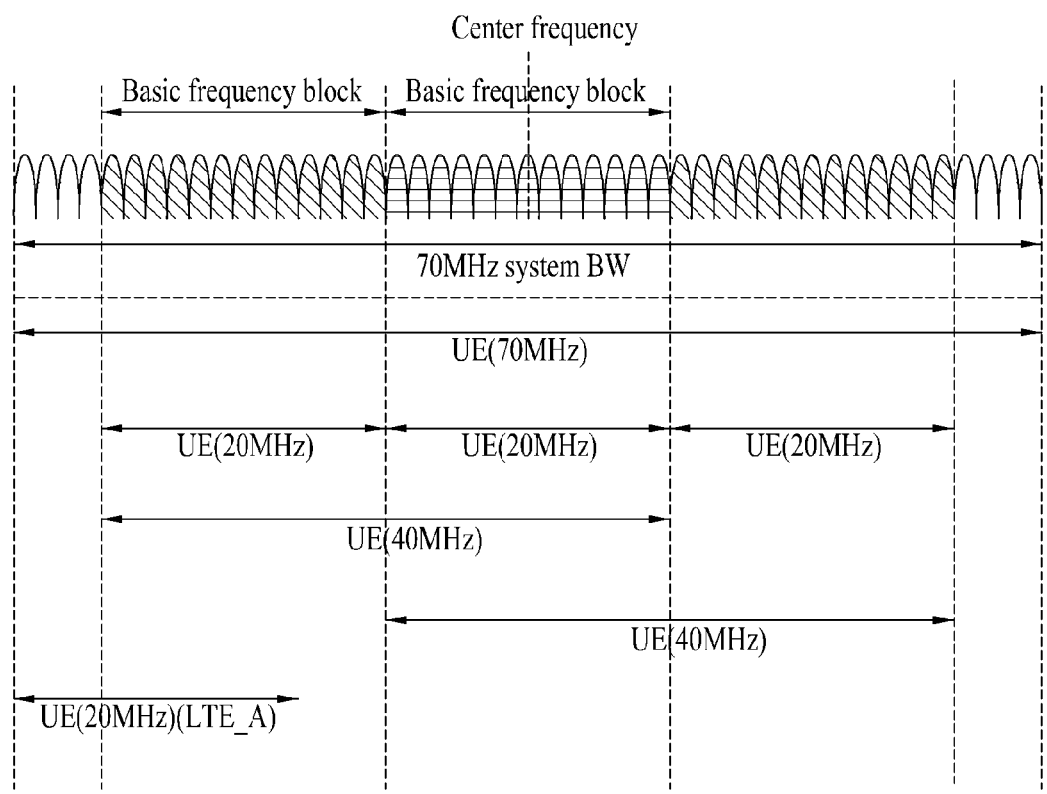

FIGS. 9 and 10 illustrate methods for setting a bandwidth of a carrier in a multi-carrier system.

A method for allocating a bandwidth of a carrier is as follows.

To support a target system bandwidth, a basic frequency block in both directions based on a specific central frequency may be allocated symmetrically. Thereafter, a frequency carrier less than the basic frequency block may be allocated to the other bands less than A MHz. At this time, even when allocating the frequency carrier to the bands less than A MHz, a necessary frequency carrier is symmetrically allocated in both directions to allocate the target system bandwidth.

In FIG. 9, a system bandwidth is set to 100 MHz and a central frequency is set to 50 MHz. In FIG. 10, a system bandwidth is set to 70 MHz and a central frequency is set to 35 MHz. Various bandwidths ranging from 20 MHz to 100 MHz may be supported by a terminal (e.g., UE).

Figure 11:
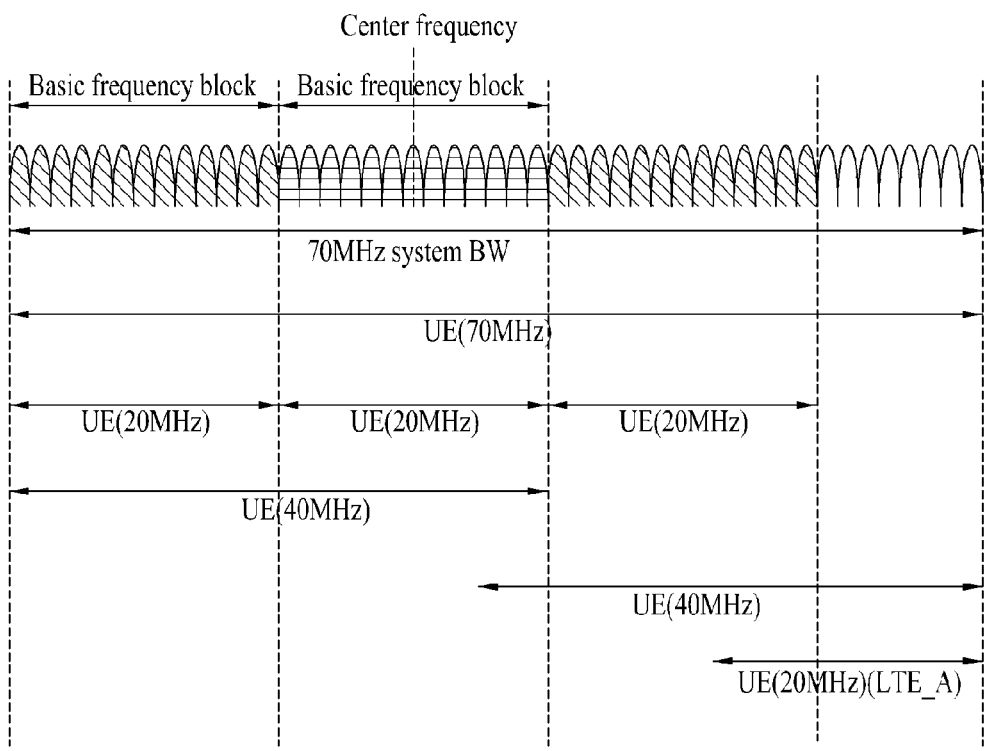
FIG. 11 illustrates another method for setting a bandwidth of a carrier in a multi-carrier system.

FIG. 11 illustrates another method for setting a bandwidth of a carrier in a multi-carrier system.

To support a target system bandwidth, a user allocates a bandwidth in units of a basic frequency block. Thereafter, a frequency carrier less than the basic frequency block may be asymmetrically allocated to the other bands less than A MHz.

Referring to FIG. 11, a basic frequency is first allocated in an overall system bandwidth and then a central frequency is set. In this case, a frequency bandwidth may be asymmetrically allocated based on the central frequency.

Hereinafter, a method for efficiently transmitting and receiving a control channel and/or a data channel will be described in detail.

FIGS. 12a and 12b illustrate examples of the allocation structure of a control channel and a data channel according to an exemplary embodiment of the present invention.

In FIG. 12a, a base station may allocate, in an individual carrier unit, both various setup information and control information (e.g., carrier-dependent information or carrier-specific information), necessary for each carrier. Referring to FIG. 12a, the base station may allocate a radio channel (e.g., a control channel or a data channel) for each carrier to transmit data within each carrier in a multi-carrier system.

For example, a physical downlink shared channel (PDSCH) and a physical downlink control channel (PDCCH), corresponding to carrier 0, are allocated to carrier 0. In this way, the control channel and the physical channel may be allocated to carrier 1 to carrier n-1.

In this case, control information needed to transmit and receive the PDSCH in carrier 1 may be allocated to the PDCCH in carrier 1. That is, the PDCCH and the PDSCH are separately encoded within each carrier.

The channel allocation structure of FIG. 12b is substantially similar or identical to the structure of FIG. 12a. However, in FIG. 12b, a carrier-common control information (CCCI) used in a multi-carrier system may be allocated to a specific carrier or carriers of a prescribed number. Referring to FIG. 12b, allocation of CCCI (e.g., carrier-dependent information or carrier-specific information) to carrier 1 is shown. That is, the CCCI of the multi-carrier system is transmitted through a specific location and only specific control information for each carrier can be transmitted through a corresponding PDCCH.

The channel allocation structure of FIG. 12b may be used when both the LTE system and the LTE-A system are employed. A terminal supporting LTE-A may utilize multiple carriers. Therefore, a PDCCH to which the CCCI is allocated is transmitted to the LTE-A terminal so that the LTE-A terminal can efficiently use the multiple carriers.

Figure 13:
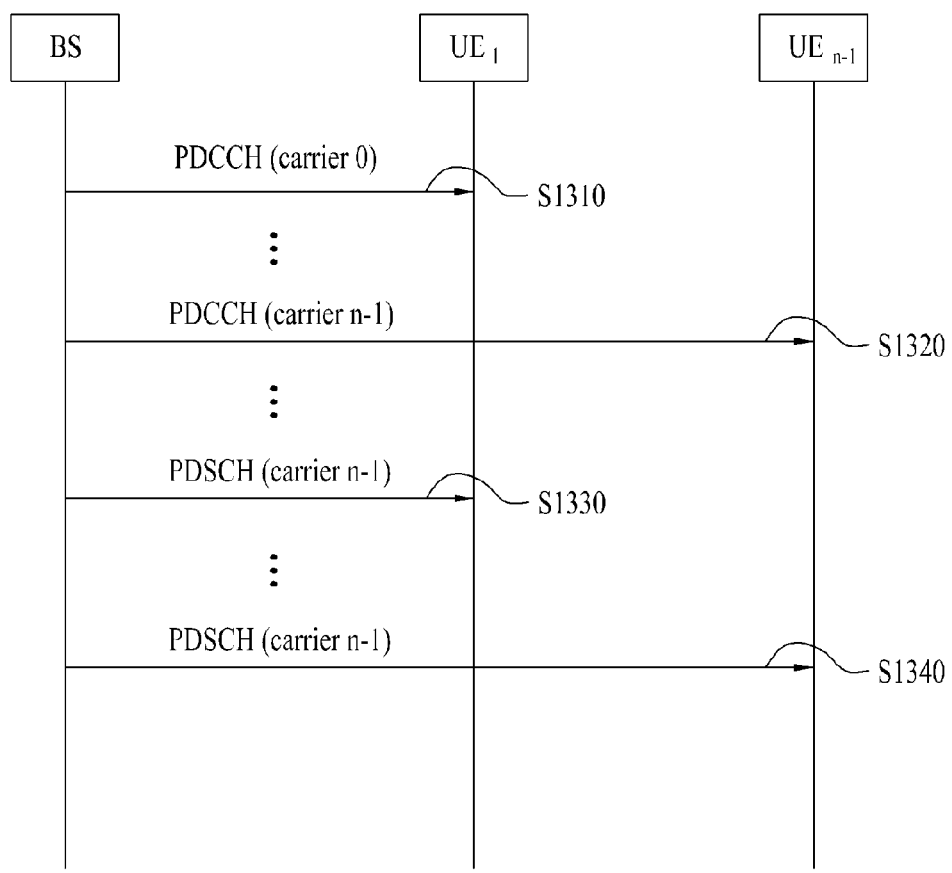
FIG. 13 illustrates a method for transmitting a control channel and a data channel according to an exemplary embodiment of the present invention.

FIG. 13 illustrates a method for transmitting a control channel and a data channel according to an exemplary embodiment of the present invention.

In FIG. 13, it is assumed that the channel allocation structure described in FIG. 12a is used. Referring to FIG. 13, a base station (BS) transmits a PDCCH to a first terminal $UE_1$ through carrier 0 (step S1310).

The base station transmits the PDCCH to an (n-1)th terminal $UE_{n-1}$ through carrier n-1. In this way, the base station can transmit the PDCCH to terminals within a cell of the base station (step S1320).

The PDCCH transmitted to terminals in steps S1310 to S1320 may include various setup information and/or control information necessary for each carrier.

The base station transmits a PDSCH to first to (n-1)th terminals using carrier 0 to carrier n-1. The first to (n-1)th terminals receive the PDSCH based on the control information received in steps S1310 to S1320 (step S1330 and S1340). While the method for transmitting and receiving the control channel and the data channel using the channel allocations structure of FIG. 12a has been described with reference to FIG. 13, the control channel and the data channel can be transmitted and received using the channel allocation structure of FIG. 12b.

For example, assuming that the (n-1)th terminal UEn-1 is an LTE-A terminal, CCCI may be allocated to the PDCCH of an (n-1)th carrier. In this case, the base station may transmit the CCCI to the (n-1)th terminal using the (n-1)th carrier. Since the (n-1)th terminal obtains the CCCI of the multi-carrier system, the control channel and the data channel can be effectively received.

Figure 14:
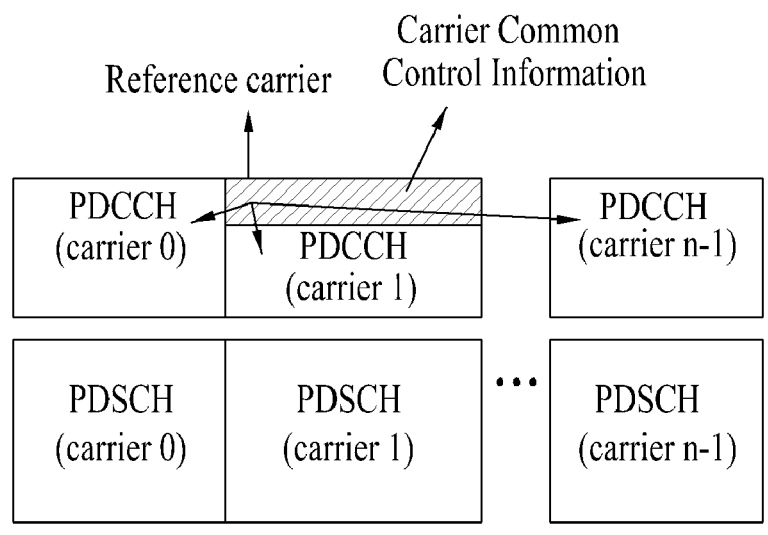
FIGS. 14a and 14b illustrate other examples of the allocation structure of a control channel and a data channel according to an exemplary embodiment of the present invention.
Figure 14:
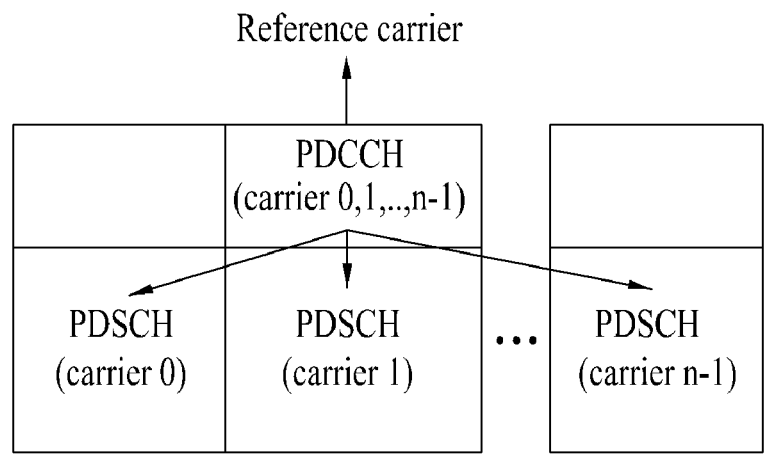

FIGS. 14a and 14b illustrate other examples of the allocation structure of a control channel and a data channel according to an exemplary embodiment of the present invention.

FIGS. 14a and 14b use one or more specific carriers as a reference carrier (RC) in a multi-carrier system. A base station may allocate carrier-dependent information or carrier-specific information or PDSCH-dependent information to a PDCCH of each carrier and may allocate carrier-independent information or carrier-common information to a PDCCH of a preset reference carrier.

The carrier-specific information may include data transmission information for each carrier, connection information within a carrier, information necessary for resource allocation within a corresponding carrier, etc. The carrier-common information may include available carrier state information, carrier allocation information such as specifically added plural carrier designation, specific higher control information for each carrier, system parameter information of a cell unit, etc.

Namely, a base station may allocate one or more reference carriers and terminals may first receive system information or control information through the reference carrier. The terminals may receive a PDCCH related to each carrier based on the system information or control information.

Referring to the channel allocation structure of FIG. 14a, a base station allocates a control channel PDCCH and a data channel PDSCH for each carrier. The base station may further allocate CCCI to a part of the PDCCH. Such an allocation structure may be used when both the LTE-A system and the LTE system are employed. Specifically, a terminal supporting LTE-A receives the PDCCH to which the CCCI is allocated and obtains the CCCI, thereby performing efficient communication.

Referring to the channel allocation structure of FIG. 14b, a base station sets a reference carrier and transmits a PDCCH only through the reference carrier. When using the channel allocations structure of FIG. 14b, separate coding and/or joint coding can be performed upon one or more control channels in multiple carriers.

A coding method applied to FIG. 14b will be described in detail with reference to FIG. 15.

Figure 15:
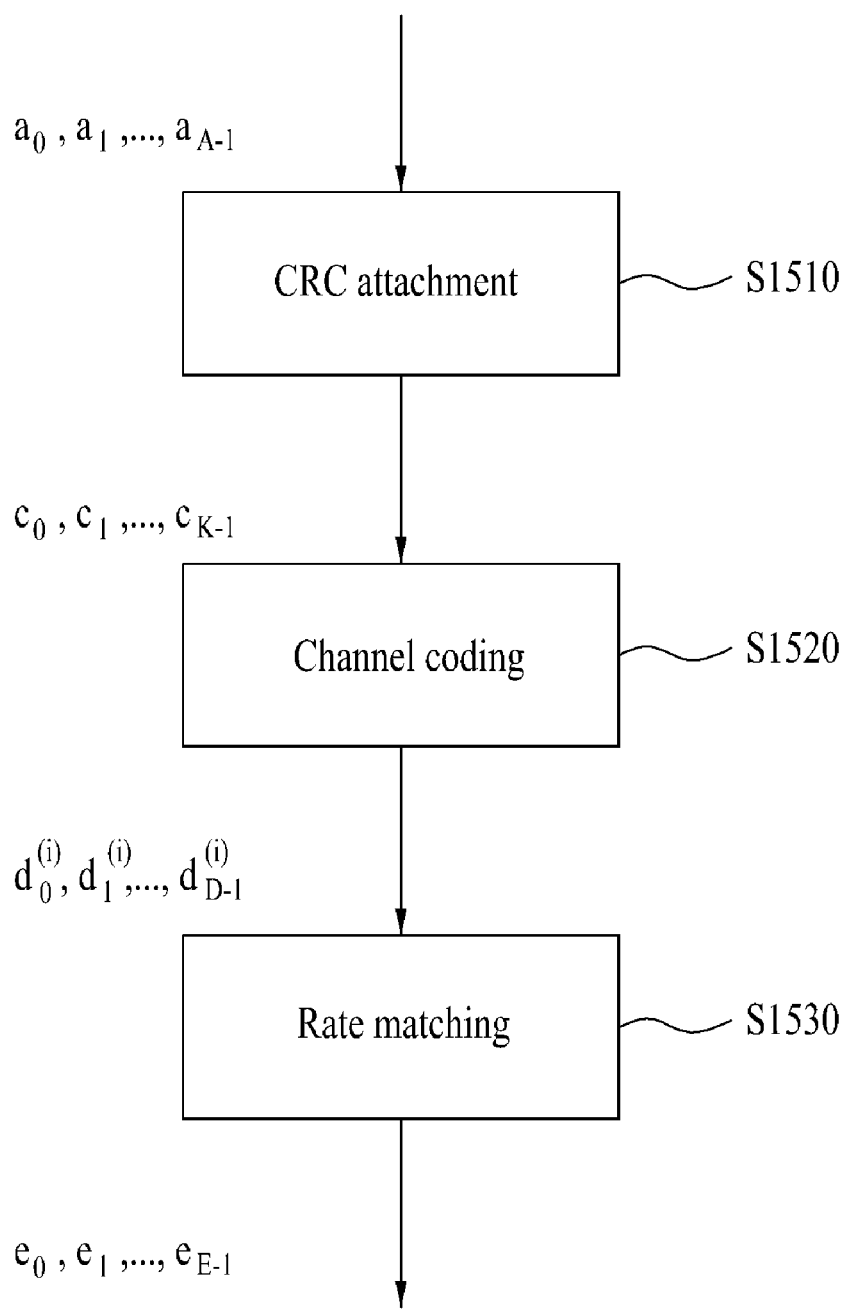
FIG. 15 illustrates an example of a method for processing downlink control information applicable to the embodiments of the present invention.

FIG. 15 illustrates an example of a method for processing downlink control information applicable to the embodiments of the present invention.

A base station processes downlink control information (DCI) of a control channel and transmits the processed DCI to a terminal. Referring to FIG. 15, the base station attaches cyclic redundancy check (CRC) bits to data bit streams $a_0, a_1, \ldots, a_{A-1}$ (step S1510).

Data bit streams $c_0, c_1, \ldots, c_{K-1}$, generated by CRC bits attachment, are input to a channel coding module. The base station channel-codes the data blocks input from the channel coding module to generate coded blocks $d_0, d_1, \ldots, d_{D-1}$ (step S1520).

The base station transmits the coded blocks to a rate matching module and performs a modulation process to generate symbols $e_0, e_1, \ldots, e_{E-1}$ of a control channel element (CCE) unit which can be transmitted to terminals (step S1530).

In step S1520 of FIG. 15, control information as to a terminal supporting multiple carriers, for example, LTE-A can be coded. At this time, the following coding methods may be used as separate coding and/or joint coding methods.

1. Full separate coding: a base station processes DCI upon PDCCHs for a PDSCH of each terminal transmitted through each carrier and then transmits the DCI processed PDCCHs. The full separate coding method may be applied to the channel allocation structures of FIGS. 12*a* and 12*b*.

2. Partial separate/joint coding: a base station performs joint coding upon control information of multiple terminals within each carrier in a multi-carrier system and performs separate coding upon joint-coded PDCCHs for each carrier. That is, after all PDCCHs within each carrier are multiplexed, the DCI processing of FIG. 15 is performed.

As another method, for a terminal, LTE-A UE, supporting multiple carriers, a base station performs joint coding upon each PDSCH for PDSCHs of one or more carriers and performs separate coding upon joint-coded PDCCHs for each terminal. Namely, after PDCCHs for a PDSCH of multiple carriers, which can be used by the LTE-A UE, are multiplexed, the DCI processing of FIG. 15 is performed.

3. Full joint coding: a base station multiplexes PDCCHs for a PDSCH of all carriers of all terminals and thereafter performs the DCI process of FIG. 15.

Referring back to FIG. 14*b*, a base station can set a prescribed carrier among multiple carriers to a reference carrier. In this embodiment, the reference carrier or a reference band indicates an arbitrary carrier which can be a reference in a multi-carrier system. The reference carrier may be expressed by another term such as a primary carrier or an anchor carrier.

A base station can transmit and receive various control information using the channel allocation structure of FIG. 14*b*. As a method using the reference carrier to transmit and receive the control information, a method is considered for transmitting at least one of a synchronization channel (SCH), a primary broadcast channel (PBCH), and system information (SI-x) only through the reference carrier. Here, the SCH, PBCH, and SI-x may be transmitted through carriers other than the reference carrier.

When the SCH, BCH, and SI-x are transmitted only through the reference carrier, since an LTE terminal supports only a single carrier, data can be transmitted and received only through the reference carrier. Accordingly, carriers except for the reference carrier can be used as LTE-A only carriers.

A method for setting a prescribed carrier to the reference carrier may be defined permanently according to a specific method or may be defined semi-statically through higher layer signaling. In this case, the reference band or the reference carrier may be set using the first carrier or the last carrier among candidate reference bands. The setting location of the reference carrier may be changed according to channel environments or user demands.

Hereinafter, a method for allocating the reference carrier which can be used in the embodiments of the present invention will be described in detail.

1. Method for Allocating Cell-Specific Reference Carrier

The reference carrier may be set cell-specifically.

If the reference carrier is set cell-specifically, cell-specific information such as a cell ID may be used. The following Equation 1 indicates one method for setting the cell-specific reference carrier.

$$(\text{cell\_ID}) \bmod C \qquad \text{[Equation 1]}$$

In Equation 1, C indicates the number of candidate reference carriers or the number of available carriers in a corresponding cell, and cell_ID indicates a cell ID for identifying a cell.

A result derived from Equation 1 may be a carrier index indicating where a reference band is present in a corresponding cell. If the carrier index is managed in each cell, a reference carrier of a specific cell can be allocated using Equation 1. If the carrier index is not managed in each cell, a temporary carrier index among maximum available carriers can be allocated.

For example, if the carrier index is not managed in each cell and is managed for maximum available carriers, a reference signal can be set using Equation 1 when the number of candidate carriers which can be used in an arbitrary cell is less than the number of carriers which can be used in a multi-carrier system. Namely, the cell-specific reference carrier can be set by mapping the result of Equation 1 to the temporary carrier index.

Although the embodiments of the present invention use the cell ID when setting the cell-specific reference carrier, all parameters, which can be cell-specified, other than the cell ID can be used to determine the reference carrier.

In another aspect of the present invention, the reference carrier may be set semi-statically. For example, the reference carrier may be set using a measurement value of a base station (e.g., eNB measurement). Here, eNB measurement may use uplink interference received through each carrier, or channel environment information.

A method for semi-statically allocating the reference carrier is as follows. A base station fixedly sets the reference carrier using Equation 1. Next, if it is determined that a corresponding carrier has difficulty operating as the reference carrier according to eNB measurement, or communication environment information or channel environment information (e.g., an interference level, a power level, or channel quality information (CQI) received from terminals within a corresponding carrier) reported from a terminal, the base station may release an initially set reference carrier and may set another carrier as the reference carrier.

2. Method for Allocating Terminal-Specific Reference Carrier

The reference carrier may be set terminal-specifically.

For example, the reference carrier may be set from candidate carriers of each terminal using a specific parameter of a terminal, such as a UE ID. A base station may set a reference carrier for each terminal using the UE ID (e.g., cell radio network temporary identifier (C-RNTI), random access RNTI (RA-RNTI), system information RNTI (SI-RNTI), or paging RNTI (P-RNTI)) allocated to each terminal.

Using the following Equation 2, the base station may allocate one reference carrier among candidate reference carriers using a UE-specific ID to each terminal.

$$(UE\_ID) \bmod C \quad \text{[Equation 2]}$$

In Equation 2, C indicates the number of candidate reference carriers and UE_ID indicates a parameter for identifying a terminal. In the embodiments of the present invention, when setting a UE-specific reference carrier, all parameters (e.g., a MAC address), which can be UE-specific, other than the UE ID may be used.

In another aspect of the present invention, the reference carrier may be set semi-statically. A base station may fixedly set the reference carrier UE-specifically using a UE-specific parameter such as a UE ID. Next, the base station may again set a previously set reference carrier semi-statically according to communication environments, channel environments, or user demands.

For example, the terminal may feed back channel environment information, such as a signal interference level, a power level, and CQI for each carrier, to the base station through uplink. The base station may allocate an optimal reference carrier for each terminal using the channel environment information.

Namely, after the base station initially sets the reference carrier, if it is determined that the initially set reference carrier is inappropriate based on eNB measurement, or channel environment information fed back from the terminal, the base station may release the initially set reference carrier and may set another carrier as the reference carrier.

3. Method for Allocating Terminal Group-Specific Reference Carrier

Terminals may be divided into one or more groups within a prescribed cell, based on UE categories or quality of service (QoS) information. In this case, a base station may UE group-specifically set a reference carrier.

For example, the base station may set the reference carrier among candidate carriers of each terminal group using a specific parameter of each terminal group such as a UE group ID or a UE category index.

The following Equation 3 indicates a method for the base station to set a UE group-specific reference carrier.

$$(UE\ group\ ID) \bmod C, \text{ or}$$

$$(UE\ category\ index) \bmod C \quad \text{[Equation 3]}$$

In Equation 3, C indicates the number of candidate reference carriers. Referring to Equation 3, the base station can allocate one reference carrier among candidate reference bands to each UE group, using a UE group ID or a UE category index allocated to each UE group.

Although Equation 3 uses the UE group ID or the UE category index to set the reference carrier, all parameters for specifically identifying each UE group may be used.

In another aspect of the present invention, the reference carrier may be set semi-statically. The base station may fixedly set the reference carrier according to a UE group using a UE group-specific parameter such as a UE group ID. Next, the base station may again set a previously set reference carrier semi-statically according to communication environments, channel environments, or user demands.

For example, the terminal may feed back channel environment information, such as a signal interference level, a power level, and CQI for each carrier, to the base station though uplink. The base station may allocate an optimal reference carrier for each terminal using the channel environment information.

Namely, after the base station initially sets the reference carrier, if it is determined that the initially set reference carrier is inappropriate based on eNB measurement, or the channel environment information fed back from the terminal, the base station may release the initially set reference carrier and may set another carrier as the reference carrier.

The above-described methods for setting the reference carrier may be applied to FIG. 14b and to the following embodiments which will be described.

Figure 16:
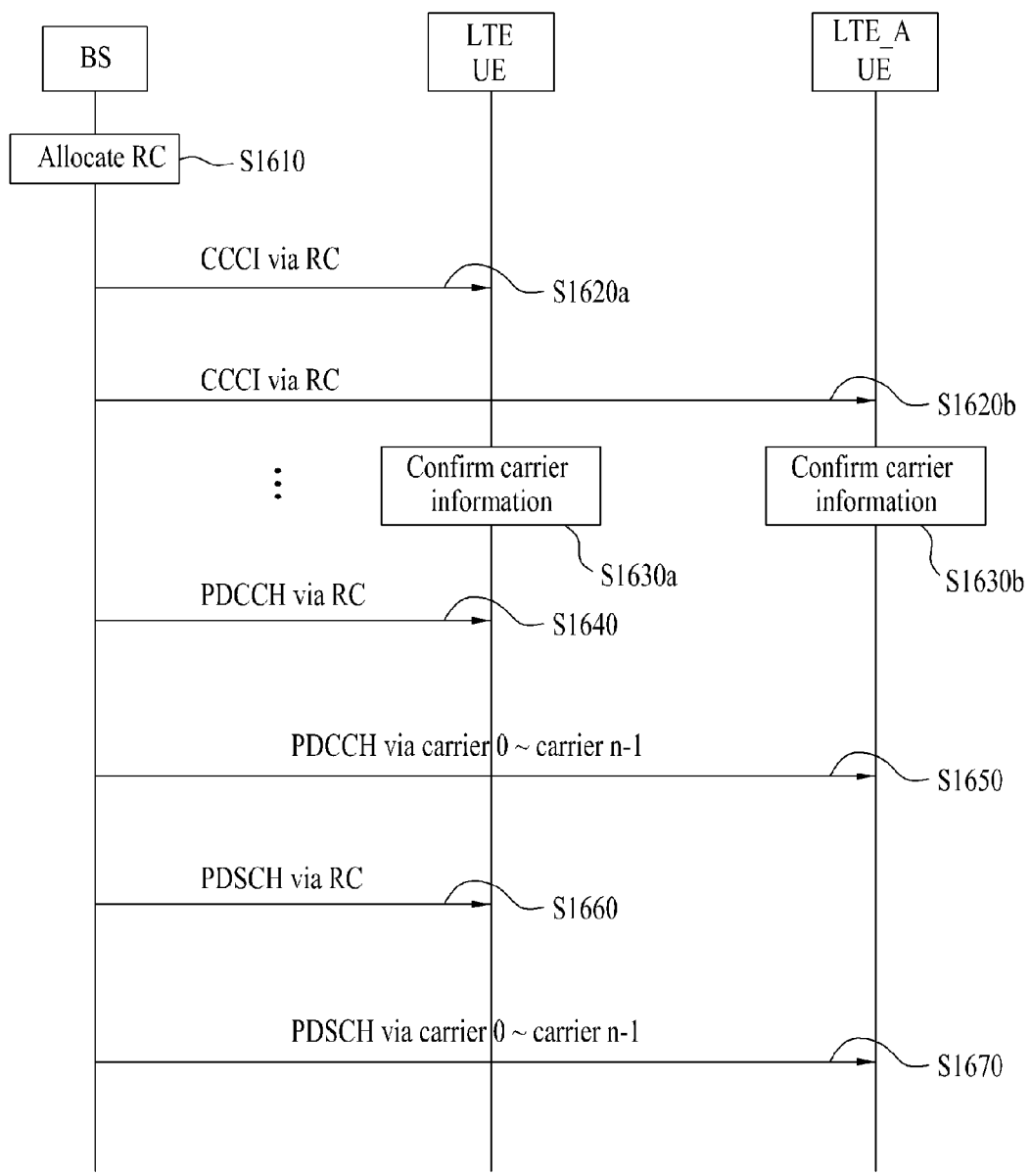
FIG. 16 illustrates another method for transmitting a control channel and a data channel according to an exemplary embodiment of the present invention.

FIG. 16 illustrates another method for transmitting a control channel and a data channel according to an exemplary embodiment of the present invention.

FIG. 16 uses the channel allocation structure of FIG. 14a to transmit the control channel and the data channel. Further, FIG. 16 illustrates a control channel transmission method using multiple carriers when both an LTE UE and an LTE_A UE are present. Specifically, a multi-carrier system can be provided while maintaining backward compatibility to support a terminal of a conventional system.

Referring to FIG. 16, a base station supporting multiple carriers allocates one or more reference carriers (RC) among the multiple carriers. At this time, the base station may allocate a single carrier used in an LTE system as the reference carrier in order to maintain backward compatibility. A method for allocating the reference carrier may use the above-described Equations 1 to 3 (step S1610).

The base station transmits CCCI to the LTE UE and the LTE_A UE through the reference carrier (steps S1620a and 1620b).

The LTE UE and the LTE_A UE can confirm carrier information included in the CCCI. More specifically, the LTE UE and the LTE_A UE can effectively receive a PDCCH and a PDSCH using the CCCI (steps S1630a and S1630b).

The base station transmits the PDCCH to the LTE UE through the reference carrier (step S1640) and transmits the PDCCH using carriers of a prescribed number among a 0th carrier to an (n-1)th carrier which can be supported in a multi-carrier system to the LTE_A UE which can support multiple carriers (step S1650).

The LTE_A UE can confirm the available indexes and number of multiple carriers using the CCCI received in step S1620b. Accordingly, the LTE_A UE can receive the PDCCH transmitted by the base station through carriers indicated by the CCCI in step S1650.

The base station transmits the PDSCH to the LTE UE through the reference carrier (step S1660) and transmits the PDSCH to the LTE_A UE using carriers of a prescribed number among the 0th carrier to the (n-1)th carrier which can be supported in the multi-carrier system (step S1670).

Figure 17:
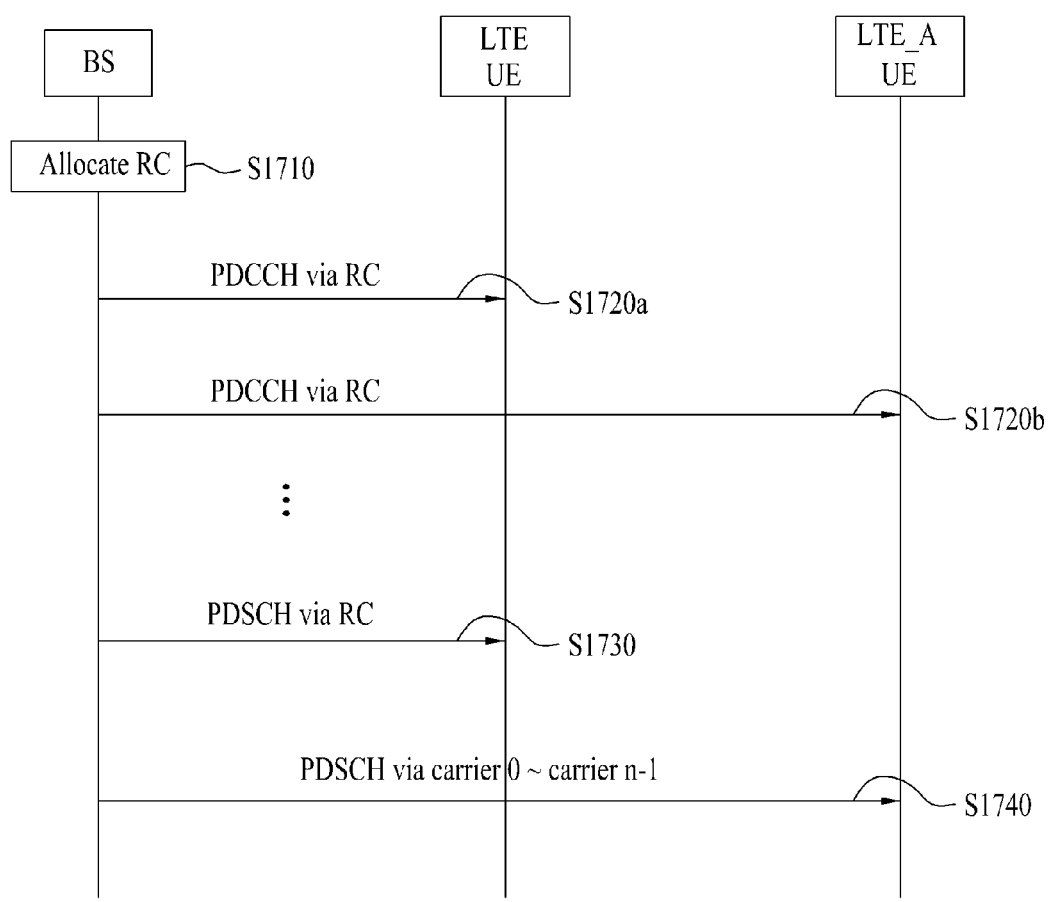
FIG. 17 illustrates a further method for transmitting a control channel and a data channel according to an exemplary embodiment of the present invention.

FIG. 17 illustrates a further method for transmitting a control channel and a data channel according to an exemplary embodiment of the present invention.

FIG. 17 uses the channel allocation structure of FIG. 14b to transmit the control channel and the data channel. More specifically, FIG. 17 illustrates a method for joint-coding control information for all carriers in a multi-carrier system and then transmitting a PDCCH through a reference carrier. Further, FIG. 17 illustrates a control channel transmission method using multiple carriers when both an LTE UE and an LTE_A UE are present.

Referring to FIG. 17, a base station supporting multiple carriers allocates a single carrier used in an LTE system as the reference carrier in order to maintain backward compatibility (step S1710).

The base station transmits a PDCCH to an LTE UE and an LTE_A UE through the reference carrier (steps S1720a and 1720b).

In step S1720, the CCCI used in FIG. 16 is not employed. Instead, the base station can transmit all control information for multiple carriers to UEs as a PDCCH of a CCE unit through separate coding and/or joint coding.

The base station transmits a PDSCH to the LTE UE through the reference carrier (step S1730) and transmits the PDSCH to the LTE_A UE using carriers of a prescribed number among a 0th carrier to an (n-1)th carrier which can be supported in the multi-carrier system (step S1740).

In the multi-carrier system, the base station may set a specific carrier as a reference band. Therefore, the base station and a terminal can effectively use the reference band in an initial registration process such as mobility management (e.g., handover) or cell search.

In the embodiments of the present invention, an SCH or a BCH may be transmitted only through the reference carrier. It is also possible to transmit the SCH and/or the BCH through multiple carriers including the reference carrier.

When considering the case where an LTE_A system (i.e., an IMT_A system) and an LTE system (i.e., an IMT system) coexist, a carrier used in the LTE system, that is, an LTE carrier may be set as the reference carrier. Therefore, the base station transmits the SCH and the BCH using the reference carrier and can effectively transmit, to terminals, carrier-common information, such as carrier allocation information, or the PDSCH for the PDSCH of each carrier.

The terminals can receive, using the reference carrier, overall information for supportable multiple carriers. For example, the terminals supporting multiple carriers can first receive, through the reference carrier, information such as a carrier index on which monitoring should be performed. Next, the terminals can receive the PDCCH for the PDSCH allocated to each carrier. In this case, the terminal may receive the PDCCH for the PDSCH of all multiple carriers through the reference carrier.

If the reference carrier is UE-specifically set, the base station can allocate UE-specific information through a corresponding reference carrier. For example, the base station can transmit, to the terminal, information, such as a blind decoding zone on multiple carriers used by an arbitrary terminal or a carrier allocation location for searching for a specific control channel, as the UE-specific information.

Figure 18:
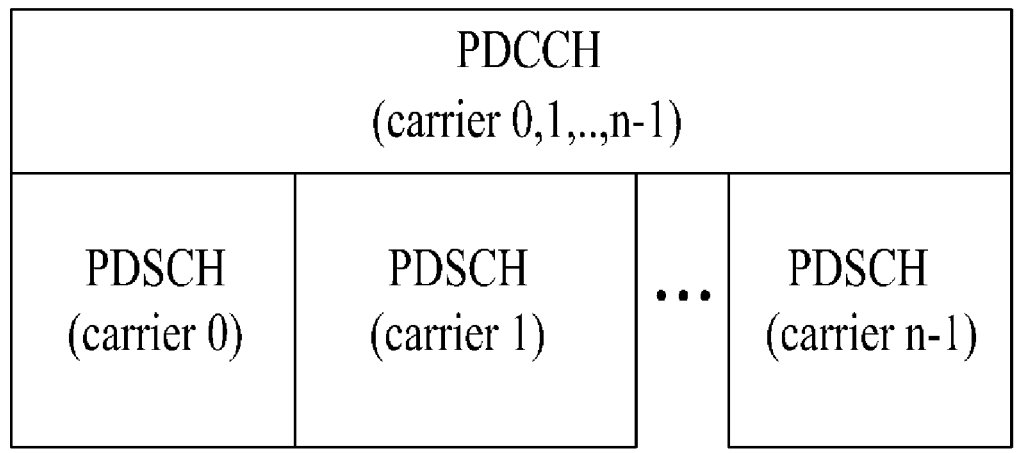
FIG. 18 illustrates another example of the allocation structure of a control channel and a data channel according to an exemplary embodiment of the present invention

FIG. 18 illustrates another example of the allocation structure of a control channel and a data channel according to an exemplary embodiment of the present invention.

Referring to FIG. 18, a base station multiplexes control information of multiple carriers to generate one PDCCH. Next, the base station transmits the generated PDCCH to terminals using all carriers (carrier 0 to carrier n-1). Specifically, FIG. 18 illustrates the channel allocation structure of one PDCCH for the whole multiple carriers and of PDSCHs transmitted through each of the multiple carriers.

To transmit the PDCCH of FIG. 18 to the terminals, the base station may segment the PDCCH over an entire carrier band rather than a specific carrier and may transmit the PDCCH. To generate the PDCCH of FIG. 18, the base station may use the separate coding and/or joint coding of FIG. 15.

Figure 12:
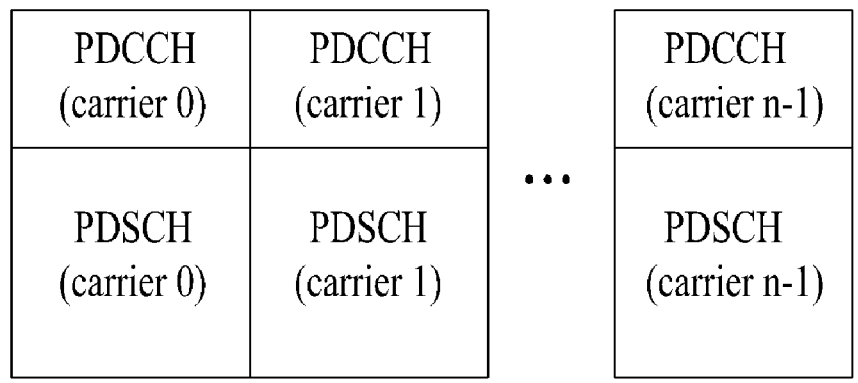
FIGS. 12a and 12b illustrate examples of the allocation structure of a control channel and a data channel according to an exemplary embodiment of the present invention.
Figure 12:
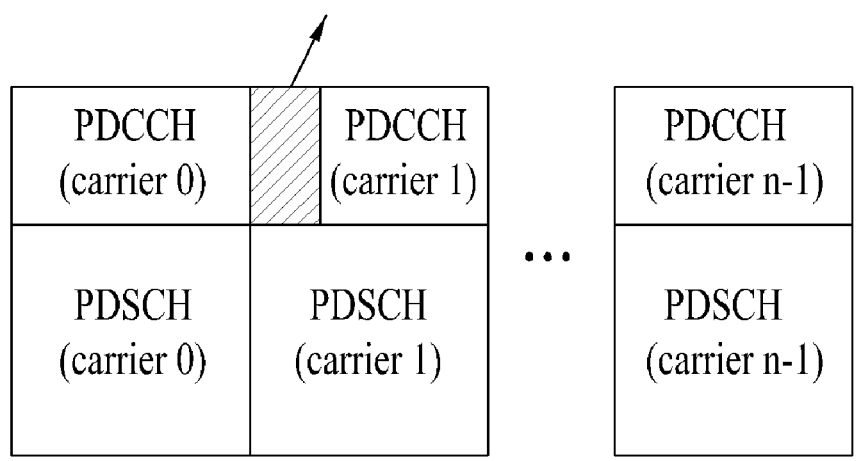

The base station and the terminals may transmit and receive the control channel and the data channel for each carrier using the methods shown in FIGS. 12, 13, and 14a. Namely, FIGS. 12, 13, and 14a can maintain the methods for transmitting and receiving the control channel of the LTE system (or IMT system) defined per carrier. Moreover, carrier-specific control information is transmitted within a corresponding carrier and thus overhead of the control channel can be determined by a scheduled carrier. Further, since an HARQ operation can be performed separately per each carrier, a transmission block can be prevented from being excessively increased during re-transmission.

When the base station and the terminals use the methods and structures shown in FIGS. 14b to 18, since the amount of the control information is maximally fixed irrespective of the number of scheduled carriers or varies according to the number of scheduled carriers, a new control channel format (DCI format) needs to be defined. In this case, in FIGS. 14b to 18, the base station transmits the PDCCH to the LTE UE through a carrier through which the PDSCH is transmitted, thereby maintaining backward compatibility. In addition, the base station can transmit, to the LTE_A UE, the PDCCH through a reference carrier or all carriers regardless of a carrier through which the PDCCH for a corresponding LTE_A UE is transmitted.

Figure 19:
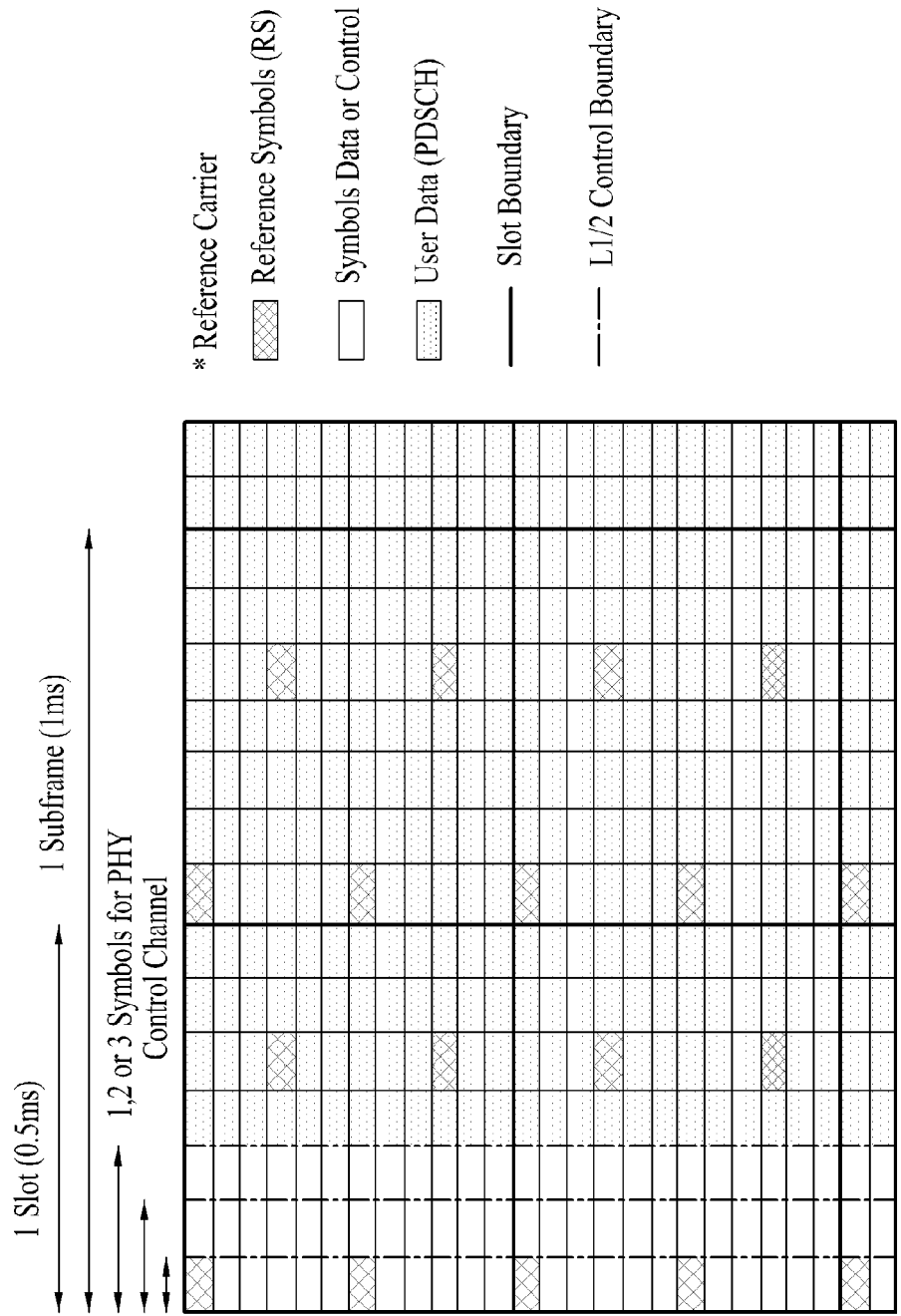
FIG. 19 illustrates an example of the structure of a subframe of a reference carrier according to another exemplary embodiment of the present invention.

FIG. 19 illustrates an example of the structure of a subframe of a reference carrier according to another exemplary embodiment of the present invention.

Referring to FIG. 19, in an LTE system, one subframe of 1 ms is comprised of two slots, each consisting of 7 OFDM symbols. In the first slot, control channels are allocated to the first three or less OFDM symbols. Data channels may be allocated to the other OFDM symbols. This is applied to the case of a normal cyclic prefix (CP). If an extended CP is used, the number of OFDM symbols included in one slot may be different.

A coordination field described in the present invention refers to a channel which can be transmitted in the first to third OFDM symbols of each subframe. That is, in a multi-carrier system, a terminal first decodes the coordination field so that the terminal can previously know information as to a carrier allocated thereto among multiple carriers (e.g., information indicating that through which carrier the control channel or data channel is transmitted), and information as to a carrier or zone upon which the terminal is to blind-decode. Accordingly, the terminal can more effectively receive data than in a wideband system.

In the embodiments of the present invention, the coordination field can be transmitted through a reference carrier. In the embodiments of the present invention, the reference carrier or the reference band means an arbitrary carrier which can be a reference in the multi-carrier system. The reference carrier may be expressed by another term such as a primary carrier or an anchor carrier.

The base station may use the reference carrier to transmit and receive the control channel. For example, the base station may transmit at least one of an SCH, a PBCH, and SI-x only through the reference carrier. In the multi-carrier system, the SCH, PBCH, and SI-x may be transmitted through carriers other than the reference carrier.

When the SCH, BCH, and SI-x are transmitted only through the reference carrier, since an LTE terminal supports only a single carrier, data can be transmitted and received only through the reference carrier. Accordingly, carriers except for the reference carrier can be used as LTE-A only carriers.

A method for setting a prescribed carrier as the reference carrier may be defined permanently according to a specific method or may be defined semi-statically through higher layer signaling. In this case, the reference band or the reference carrier may be set using the first carrier or the last carrier among candidate reference bands. The setting location of the reference carrier may be changed according to channel environments or user demands.

In the embodiments of the present invention, UE category classification may be affected by carriers each terminal can support. Therefore, different reference carriers may be set according to UE categories. The reference band for each terminal may be differently set according to service types or QoS provided to terminals.

Figure 20:
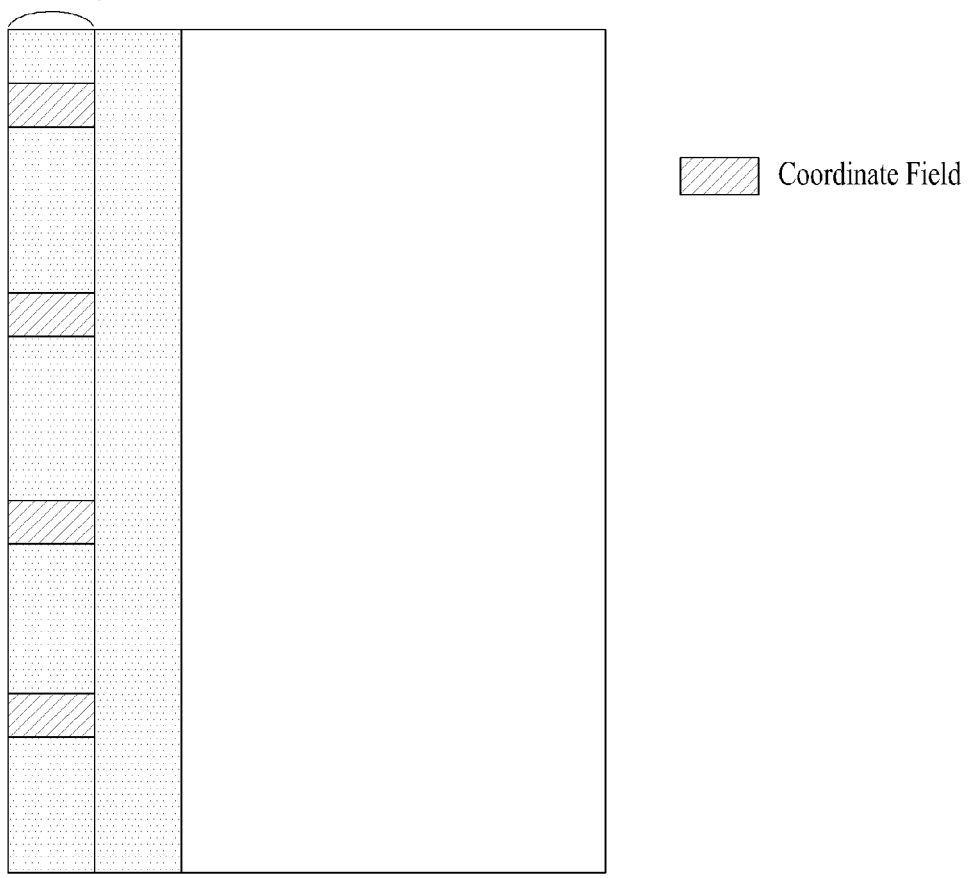
FIG. 20 illustrates a method for allocating a coordination field, which is applicable to the embodiments of the present invention.

FIG. 20 illustrates a method for allocating a coordination field, which is applicable to the embodiments of the present invention.

The coordination field may be allocated to the first to third OFDM symbols of each subframe within a reference carrier. In FIG. 20, the coordination field is allocated to the first OFDM symbol of a subframe. The allocation position of the coordination field may be determined by a cell ID and a downlink bandwidth. The coordination field may be allocated at prescribed intervals on a frequency axis to obtain a frequency diversity gain.

The coordination field in the reference carrier may be mapped to an arbitrary OFDM symbol within each subframe at uniform intervals on a frequency axis. At this time, a frequency diversity gain can be obtained.

Moreover, efficiency of blind decoding of an LTE_A UE can be improved by transmitting the coordination field through an additional channel.

For example, as an LTE UE decodes the control channel using corresponding information after primarily decoding a physical control format indicator channel (PCFICH), the LTE_A UE can decode the control channel using multi-carrier support information included in the coordination field after primarily decoding the coordination field.

Figure 21:
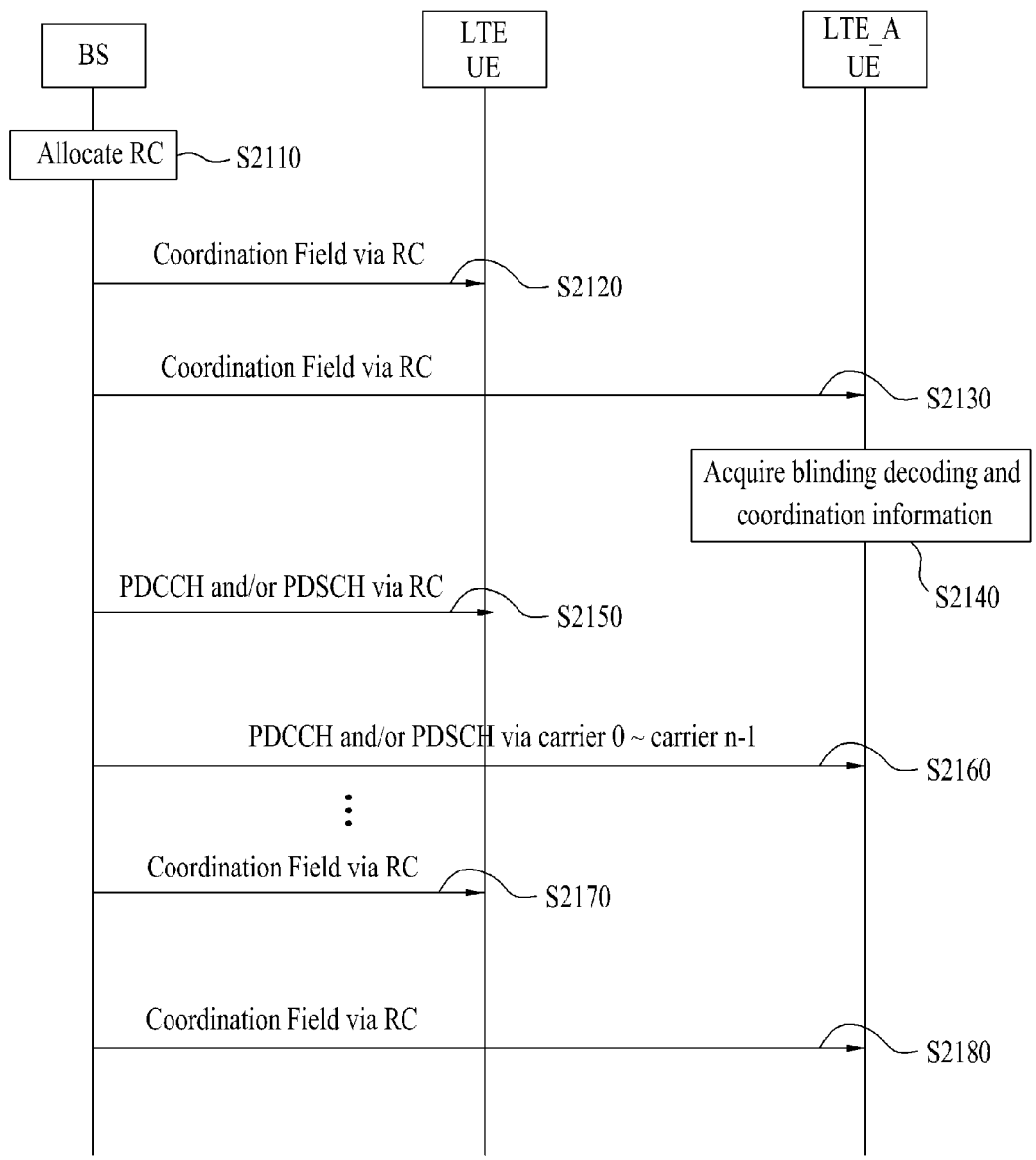
FIG. 21 illustrates a method for transmitting a radio channel using a coordination field according to another exemplary embodiment of the present invention.

FIG. 21 illustrates a method for transmitting a radio channel using a coordination field according to another exemplary embodiment of the present invention.

In FIG. 21, it is assumed that both an LTE UE using an LTE system (IMT system) and an LTE_A UE using an LTE_A system (IMT_A system) coexists. That is, a base station introduces the LTE_A system while satisfying backward compatibility. However, the LTE UE does not require coordination information, because the LTE UE can support only a single carrier and does not need to obtain the coordination information for multiple carriers.

Referring to FIG. 21, the base station supporting multiple carriers may allocate one or more reference carriers among the multiple carriers. To maintain backward compatibility, the base station may allocate a single carrier used in the LTE system as the reference carrier. A method for allocating the reference carrier may use the above-described Equations 1 to 3 (step S2110).

The base station may transmit a coordination field in units of n control channel element(CCE)s through the reference carrier. At this time, 'n' indicates a CCE aggregation level. When the LTE UE is used, 'n' may be 1, 2, 4, or 8. However, when only the LTE_A UE is used, 'n' may be natural numbers other than the afore-mentioned aggregation level (steps S2120 and S2130).

In step S2120, if it is desired to receive a PDCCH for n CCEs transmitting the coordination field, the LTE UE can perform blind decoding for n CCEs. At this time, the LTE UE cannot obtain information included in the coordination field since CRC detection may fail in a blind decoding process for n CCEs used for transmission of the coordination field. Even in this case, the LTE UE continues to perform the blind decoding and thereafter can receive the PDCCH transmitted through the reference carrier.

In step S2130, the LTE_A UE performs the blind decoding upon the coordination field transmitted in units of n CCEs or decodes the coordination field transmitted to a specific location, thereby obtaining multi-carrier support information included in the coordination field (step S2140).

In step S2140, the LTE_A UE can obtain information included in the coordination field. For example, the coordination field may include carrier indication information indicating which of multiple carriers each terminal uses. The carrier indication information may be specified as a method for transmitting a carrier index used by each terminal.

The coordination field may further include information indicating that which physical resource within a specific carrier a terminal uses or information indicating whether to first perform blinding decoding upon a zone of a corresponding specific carrier.

That is, in the embodiments of the present invention, the coordination field may include information such as a carrier indication and a blind decoding zone indication. The coordination field may also include information as to a modulation & coding scheme (MCS) level which can be used in each carrier. In addition, the coordination field may include information as to a MIMO scheme and a transmission scheme which can be used in each carrier.

In the embodiments of the present invention, both carrier allocation information for the coordination field and MCS level information may be known to UEs. At this time, the two types of information may be known using independent bits or may be known as one bit through joint coding or other coding schemes.

For example, an explicit bit field may be used for the respective information transmitted through the coordination field. To reduce the bit length of the coordination field, each bit field may be joint-coded before transmission. Further, combinations of all information transmitted through the coordination field may be constructed by a table to implicitly transmit only an index of the table, rather than explicitly transmitting information of each field.

The coordination field may include information as to a power offset for each carrier. The power offset may use a power of a reference band as a reference.

Referring back to FIG. 21, the base station transmits the PDCCH and/or the PDSCH through the each carrier used for LTE to the LTE UE (step S2150).

The base station transmits the PDCCH and PDSCH to the LTE_A UE through carrier 0 to carrier n-1 supported by the multi-carrier system. The LTE_A UE can obtain multi-carrier support information (e.g., carrier allocation information, blind decoding information, MCS level information, and power offset information) through the coordination field in step S2140. Accordingly, the LTE_A UE decodes the PDCCH and the PDSCH transmitted thereto using the multi-carrier support information (steps S2160).

In the embodiments of the present invention, the coordination field may be semi-statically transmitted through higher-layer signaling according to usage. In this case, the coordination field may include overall information for supporting the multi-carrier system varying semi-statically.

As another embodiment, the coordination field may be dynamically transmitted every subframe. In this case, the coordination field may include overall information for supporting the multi-carrier system varying dynamically.

In FIG. 21, it is assumed that a method for the base station to dynamically transmit the coordination field is used every subframe. Accordingly, the base station can transmit the coordination field in each subframe to terminals within a cell thereof.

Alternatively, the base station may transmit the coordination field at periods of a prescribed subframe without transmitting the coordination field every subframe In FIG. 21, the base station may perform CRC masking on the coordination field with a common ID, which can be commonly used by LTE_A UEs, an LTE-A UE ID, or a cell ID and may transmit the masked coordination field to UEs.

It is desirable that the common ID or cell ID used to decode the coordination field by the LTE_A UEs be discriminated from the UE ID such as C-RNTI or use an ID which is not allocated to the LTE UE.

The base station may also, generate CRC with information included in the coordination field without using masking of the common ID or cell ID and may transmit the coordination field with the generated CRC.

In FIG. 21, to easily detect the coordination field, the base station may use the fixed location of the coordination field transmitted through n CCEs. For example, the base station allocates the n CCEs for transmitting the coordination field to the first part of each subframe so that the LTE_A UEs can rapidly decode the coordination field. Then the LTE_A UEs can obtain the multi-carrier support information.

The base station may fix the transmission location of the coordination field to the very beginning part of the common search space, like DCI transmitted through the common search space on logical CCEs. Alternatively, the base station may transmit the coordination field to the very end part of the common search space. The base station may transmit the coordination field even through a specific CCE index of the common search space. The base station may transmit the coordination field through a specific CCE index after the common search space or in the UE-specific search space.

In FIG. 21, when transmitting the coordination field in units of n CCEs, the base station may only use n CCEs having a relatively large aggregation level to ensure reliability at a receiving end. For example, the base station may only use CCE having an aggregation level of 4 or 8, or above 8.

If the number of bits of the coordination field is very small in FIG. 21, the added CRC for transmitting the coordination field of nCCEs may have substantial overhead. Then the base station may transmit the coordination field to a fixed position of a specific subframe or every subframe through explicit signaling such as a PCFICH of the LTE without attaching a CRC to the coordination field.

The fixed position to which the coordination field is transmitted may be determined at the first part of the subframe as described above, or may be mapped at uniform intervals on a frequency axis within a specific OFDM symbol such as the PCFICH of the LTE.

In FIG. 21, when transmitting the coordination field using nCCEs and when mapping the coordination field at uniform intervals on a frequency axis in units of a resource element group (REG), a cell-specific cyclic shift method may be applied using cell-specific information such as cell ID.

The embodiments of the present invention have mainly been described with reference to downlink. However, the technical spirit of the present invention may be identically or similarly applied to uplink. For example, when arbitrary terminals transmit control information (e.g., channel status information, ACK/NACK, scheduling request, higher layer information such as buffer state information, and pilot) to the base station through uplink, the reference carrier and the coordination field may be used as in the above-described embodiments. That is, when specifically allocating and applying reference bands for transmitting the control information according to an individual terminal or base station, the reference bands may be defined by the same methods and concept.

The above-described various embodiments of the present invention may be independently used, may be combined with each other, or may be repeatedly used.

The present invention may be embodied in other specific forms than those set forth herein without departing from the spirit or essential characteristics of the invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. Further, claims which are not explicitly dependent on each other may be combined to provide an embodiment or new claims may be added through amendment after this application is filed.

[Industrial Applicability]

The embodiments of the present invention are applicable to various radio access systems, such as 3GPP, 3GPP2, and/or institute of electrical and electronic engineers 802 (IEEE.802).xx systems. The embodiments of the present invention may be applied not only to the above radio access system but to all technical fields applying the radio access systems.

The invention claimed is:

1. A method for negotiating a multi-carrier configuration between a base station and a terminal, the method comprising:
    receiving, by the terminal via a primary carrier, a message comprising carrier common control information indicating available carriers in a network;
    receiving, by the terminal via the primary carrier, a first message comprising information specifying multiple carriers supported by the base station;
    transmitting, by the terminal, a second message comprising information specifying one or more carriers simultaneously supported by the terminal and information indicating a number of the one or more carriers supported by the terminal; and
    receiving, by the terminal, a third message in response to the second message, wherein the third message comprises information indicating one or more carriers assigned to the terminal and information indicating a number of the one or more carriers assigned to the terminal,
    wherein the multiple carriers have two or more carriers supported by the base station, and
    the multiple carriers consist of the primary carrier and one or more secondary carriers.

2. The method according to claim 1, wherein the first message is broadcast to all terminals in a cell which is covered by the base station, and
    wherein the second message and the third message are unicast messages transmitted to specific entities.

3. The method according to claim 1, further comprising:
    transmitting a scheduling request to the base station via the primary carrier assigned to the terminal.

4. The method according to claim 1, wherein the information specifying the multiple carriers which are assigned to the terminal is a coordination field.

5. The method according to claim 4, wherein the coordination field further includes at least one of modulation & coding scheme (MCS) level information, multiple-input multiple-output (MIMO) scheme information, transmission scheme information, and power offset information.

6. A method for negotiating a multi-carrier configuration between a base station and a terminal, the method comprising:
    transmitting, by the base station via a primary carrier, a message comprising carrier common control information indicating available carriers in a network;

transmitting, by the base station via the primary carrier, a first message comprising information specifying multiple carriers supported by the base station;

receiving, by the base station, a second message comprising information specifying one or more carriers simultaneously supported by the terminal and information indicating a number of the one or more carriers supported by the terminal; and transmitting, by the base station, a third message in response to the second message, wherein the third message comprises information indicating one or more carriers assigned to the terminal and information indicating a number of the one or more carriers assigned to the terminal, wherein the multiple carriers have two or more carriers supported by the base station, and the multiple carriers consist of the primary carrier and one or more secondary carriers.

7. The method according to claim 6, wherein the first message is broadcast to all terminals in a cell which is covered by the base station, and wherein the second message and the third message are unicast messages transmitted to specific entities.

8. The method according to claim 6, further comprising:
receiving a scheduling request from the terminal via the primary carrier assigned to the terminal.

9. The method according to claim 6, wherein the information specifying the multiple carriers which are assigned to the terminal is a coordination field.

10. The method according to claim 9, wherein the coordination field further includes at least one of modulation & coding scheme (MCS) level information, multiple-input multiple-output (MIMO) scheme information, transmission scheme information, and power offset information.

11. A terminal for of negotiating a multi-carrier configuration with a base station, the terminal comprising:
a radio frequency (RF) module;
wherein the terminal is configured to:
receive, via a primary carrier, a message by using the RF module, the message comprising carrier common control information indicating available carriers in a network;
receive, via the primary carrier, a first message by using the RF module, the first message comprising information specifying multiple carriers supported by the base station;
transmit a second message by using the RF module, the second message comprising information specifying one or more carriers simultaneously supported by the terminal and information indicating a number of the one or more carriers supported by the terminal; and
receive a third message by using the RF module in response to the second message, wherein the third message comprises information indicating one or more carriers assigned to the terminal and information indicating a number of the one or more carriers assigned to the terminal;
wherein the multiple carriers have two or more carriers supported by the base station, and
the multiple carriers consist of the primary carrier and one or more secondary carriers.

12. The terminal according to claim 11, wherein the first message is broadcast to all terminals in a cell which is covered by the base station, and wherein the second message and the third message are unicast messages transmitted to specific entities.

13. The terminal according to claim 11, wherein the terminal is further configured to transmit a scheduling request to the base station via the primary carrier assigned to the terminal.

14. The terminal according to claim 11, wherein the information specifying the multiple carriers which are assigned to the terminal is a coordination field.

15. The terminal according to claim 14, wherein the coordination field further includes at least one of modulation & coding scheme (MCS) level information, multiple-input multiple-output (MIMO) scheme information, transmission scheme information, and power offset information.

16. A base station for negotiating a multi-carrier configuration with a terminal, the base station comprising:
a radio frequency (RF) module;
wherein the base station is configured to:
transmit, via a primary carrier, a message by using the RF module, the message comprising carrier common control information indicating available carriers in a network;
transmit a first message by using the RF module, the first message comprising information specifying multiple carriers supported by the base station;
receive a second message by using the RF module, the second message comprising information specifying one or more carriers simultaneously supported by the terminal and information indicating a number of the one or more carriers supported by the terminal; and
transmit a third message by using the RF module in response to the second message, wherein the third message comprises information indicating one or more carriers assigned to the terminal and information indicating a number of the one or more carriers assigned to the terminal;
wherein the multiple carriers have two or more carriers supported by the base station, and
the multiple carriers consist of the primary carrier and one or more secondary carriers.

17. The base station according to claim 16, wherein the first message is broadcast to all terminals in a cell which is covered by the base station, and wherein the second message and the third message are unicast messages transmitted to specific entities.

18. The base station according to claim 16, wherein the base station further is configured to receive a scheduling request from the terminal via the primary carrier assigned to the terminal.

19. The base station according to claim 16, wherein the information specifying the multiple carriers which are assigned to the terminal is a coordination field.

20. The base station according to claim 19, wherein the coordination field further includes at least one of modulation & coding scheme (MCS) level information, multiple-input multiple-output (MIMO) scheme information, transmission scheme information, and power offset information.

* * * * *

UNITED STATES PATENT AND TRADEMARK OFFICE
CERTIFICATE OF CORRECTION

| | | |
|---|---|---|
| PATENT NO. | : 8,467,341 B2 | Page 1 of 1 |
| APPLICATION NO. | : 12/812718 | |
| DATED | : June 18, 2013 | |
| INVENTOR(S) | : Kim et al. | |

It is certified that error appears in the above-identified patent and that said Letters Patent is hereby corrected as shown below:

ON THE TITLE PAGE:

At item [30] correct the Foreign Application Priority Data to read as follows:

-- Feb. 4, 2009   (KR) ............... 10-2009-0008915
   Feb. 4, 2009   (KR) ............... 10-2009-0008916 --.

Signed and Sealed this
Twenty-fourth Day of September, 2013

Teresa Stanek Rea
*Deputy Director of the United States Patent and Trademark Office*